(12) United States Patent
Harijono et al.

(10) Patent No.: US 7,486,673 B2
(45) Date of Patent: Feb. 3, 2009

(54) METHOD AND SYSTEM FOR REASSEMBLING PACKETS PRIOR TO SEARCHING

(75) Inventors: Indra Gunawan Harijono, St. Louis, MO (US); Ho Jae Lee, Chesterfield, MO (US); Uooyeol Yoon, St. Louis, MO (US)

(73) Assignee: Connect Technologies Corporation, Tokyo (JP)

( * ) Notice: Subject to any disclaimer, the term of this patent is extended or adjusted under 35 U.S.C. 154(b) by 689 days.

(21) Appl. No.: 11/214,384

(22) Filed: Aug. 29, 2005

(65) Prior Publication Data

US 2007/0047457 A1    Mar. 1, 2007

(51) Int. Cl.
*H04L 12/56* (2006.01)
*H04L 12/28* (2006.01)

(52) U.S. Cl. .................. 370/389; 370/394; 370/471; 370/474; 370/902

(58) Field of Classification Search .......... 370/389, 370/473, 474, 394, 395.5, 395.52, 470, 471, 370/901–903, 908, 912
See application file for complete search history.

(56) References Cited

U.S. PATENT DOCUMENTS

| | | | |
|---|---|---|---|
| 4,593,353 A | 6/1986 | Pickholtz | |
| 4,868,376 A | 9/1989 | Lessin et al. | |
| 5,369,605 A | 11/1994 | Parks | |
| 5,469,161 A | 11/1995 | Bezek | |
| 5,497,488 A | 3/1996 | Akizawa et al. | |
| 5,511,213 A | 4/1996 | Correa | |
| 5,525,982 A | 6/1996 | Cheng et al. | |
| 5,532,693 A | 7/1996 | Winters et al. | |
| 5,542,045 A | 7/1996 | Levine | |
| 5,546,463 A | 8/1996 | Caputo et al. | |
| 5,576,985 A | 11/1996 | Holtz | |
| 5,602,764 A | 2/1997 | Eskandari-Gharnin et al. | |

(Continued)

FOREIGN PATENT DOCUMENTS

EP    0859333    8/1998

(Continued)

OTHER PUBLICATIONS

Cohen, "Recursive hashing functions for n-grams", ACM Transactions on Information Systems, vol. 15, No. 3, Jul. 1997, pp. 291-320.

(Continued)

*Primary Examiner*—Aung S Moe
*Assistant Examiner*—Asif H Khan
(74) *Attorney, Agent, or Firm*—Thompson Coburn LLP; Kevin M. Kercher, Esq.

(57) ABSTRACT

A method and system for inspecting a data packet stream in a computer network for patterns that fall across data packet boundaries is disclosed. This includes determining if two or more data packets are consecutive in the data packet stream, combining data payloads from the consecutive data packets, and analyzing the combined data payloads from the consecutive data packets for a plurality of patterns of character combinations, wherein the maximum length of the combined data payloads is one less than the maximum number of characters for a pattern having a longest length of the plurality of patterns of character combinations. This can include a content searching engine and/or a regular expression engine. There are optional aspects to return data packets to an outgoing data stream based on predetermined criteria and if the data packets are in the system for over a predetermined time period.

46 Claims, 17 Drawing Sheets

U.S. PATENT DOCUMENTS

| | | |
|---|---|---|
| 5,631,971 A | 5/1997 | Sparrow |
| 5,680,612 A | 10/1997 | Asada et al. |
| 5,737,424 A | 4/1998 | Elteto et al. |
| 5,777,608 A | 7/1998 | Lipovski et al. |
| 5,778,071 A | 7/1998 | Caputo et al. |
| 5,805,801 A | 9/1998 | Holloway et al. |
| 5,809,145 A | 9/1998 | Slik et al. |
| 5,826,011 A | 10/1998 | Chou et al. |
| 5,829,051 A | 10/1998 | Steely, Jr. et al. |
| 5,845,298 A | 12/1998 | O'Connor et al. |
| 5,856,977 A | 1/1999 | Yang et al. |
| 5,867,609 A | 2/1999 | Shamoon et al. |
| 5,878,142 A | 3/1999 | Caputo et al. |
| 5,907,838 A | 5/1999 | Miyasaka et al. |
| 5,913,216 A | 6/1999 | Kneuer et al. |
| 5,940,389 A | 8/1999 | Yang et al. |
| 5,987,028 A | 11/1999 | Yang et al. |
| 6,005,940 A | 12/1999 | Kulinets |
| 6,070,162 A | 5/2000 | Miyasaka et al. |
| 6,079,621 A | 6/2000 | Vardanyan et al. |
| 6,098,089 A | 8/2000 | O'Connor et l. |
| 6,119,120 A | 9/2000 | Miller |
| 6,128,741 A | 10/2000 | Goetz et al. |
| 6,147,890 A | 11/2000 | Kawana et al. |
| 6,151,598 A | 11/2000 | Shaw et al. |
| 6,167,136 A | 12/2000 | Chou |
| 6,167,393 A | 12/2000 | Davis, III et al. |
| 6,223,172 B1 | 4/2001 | Hunter et al. |
| 6,240,407 B1 | 5/2001 | Chang et al. |
| 6,240,436 B1 | 5/2001 | McGregor |
| 6,253,243 B1 | 6/2001 | Spencer |
| 6,263,313 B1 | 7/2001 | Milsted et al. |
| 6,278,782 B1 | 8/2001 | Ober et al. |
| 6,282,290 B1 | 8/2001 | Powell et al. |
| 6,282,657 B1 | 8/2001 | Kaplan et al. |
| 6,307,936 B1 | 10/2001 | Ober et al. |
| 6,314,506 B1 | 11/2001 | Stanton et al. |
| 6,338,056 B1 | 1/2002 | Dessloch et al. |
| 6,345,256 B1 | 2/2002 | Milsted et al. |
| 6,381,242 B1 | 4/2002 | Maher, III et al. |
| 6,397,331 B1 | 5/2002 | Ober et al. |
| 6,412,069 B1 | 6/2002 | Kavsan |
| 6,438,612 B1 | 8/2002 | Ylonen et al. |
| 6,442,295 B2 | 8/2002 | Navoni et al. |
| 6,453,415 B1 | 9/2002 | Ober |
| 6,463,538 B1 | 10/2002 | Elteto |
| 6,523,119 B2 | 2/2003 | Pavlin et al. |
| 6,671,808 B1 | 12/2003 | Abbott et al. |
| 6,678,734 B1 | 1/2004 | Haatainen et al. |
| 6,704,871 B1 | 3/2004 | Kaplan et al. |
| 6,708,273 B1 | 3/2004 | Ober et al. |
| 6,781,992 B1 | 8/2004 | Rana et al. |
| 6,807,553 B2 | 10/2004 | Orelemans |
| 6,842,896 B1 | 1/2005 | Redding et al. |
| 6,848,045 B2 | 1/2005 | Long et al. |
| 6,856,981 B2 | 2/2005 | Wyschogrod et al. |
| 6,941,404 B2 | 9/2005 | Oerlemans et al. |
| 6,959,297 B2 | 10/2005 | Oh et al. |
| 6,973,565 B2 | 12/2005 | Couillard |
| 2001/0013802 A1 | 8/2001 | Faulcon et al. |
| 2001/0043702 A1 | 11/2001 | Elteto et al. |
| 2001/0056540 A1 | 12/2001 | Ober et al. |
| 2002/0034329 A1 | 3/2002 | Navoni et al. |
| 2002/0046342 A1 | 4/2002 | Elteto et al. |
| 2002/0104004 A1 | 8/2002 | Couillard |
| 2002/0120810 A1 | 8/2002 | Brouwer |
| 2002/0129290 A1 | 9/2002 | Couillard |
| 2002/0157003 A1 | 10/2002 | Beletski |
| 2002/0188858 A1 | 12/2002 | Oerlemans |
| 2002/0191548 A1 | 12/2002 | Ylonen et al. |
| 2003/0026427 A1 | 2/2003 | Couillard |
| 2003/0028664 A1 | 2/2003 | Tan et al. |
| 2003/0028778 A1 | 2/2003 | Couillard |
| 2003/0065800 A1 | 4/2003 | Wyschogrod et al. |
| 2003/0097577 A1 | 5/2003 | Sotoodeh et al. |
| 2003/0108193 A1 | 6/2003 | Sotoodeh |
| 2003/0110208 A1 | 6/2003 | Wyschogrod et al. |
| 2003/0110379 A1 | 6/2003 | Ylonen et al. |
| 2003/0110389 A1 | 6/2003 | Elteto |
| 2003/0123491 A1 | 7/2003 | Couillard |
| 2003/0163738 A1 | 8/2003 | Couillard |
| 2003/0163803 A1 | 8/2003 | Wyschogrod et al. |
| 2004/0015905 A1 | 1/2004 | Huima |
| 2004/0034674 A1 | 2/2004 | Benschop |
| 2004/0057430 A1 | 3/2004 | Paavolainen |
| 2004/0059907 A1 | 3/2004 | Cochran et al. |
| 2004/0066274 A1 | 4/2004 | Bailey |
| 2004/0098585 A1 | 5/2004 | Grove et al. |
| 2004/0098596 A1 | 5/2004 | Elteto et al. |
| 2004/0162826 A1 | 8/2004 | Wyschogrod et al. |
| 2004/0168151 A1 | 8/2004 | Elteto |
| 2004/0215966 A1 | 10/2004 | Elteto |
| 2005/0111446 A1* | 5/2005 | Greaves et al. .............. 370/389 |
| 2005/0165966 A1* | 7/2005 | Gai et al. .................... 709/249 |
| 2005/0238010 A1* | 10/2005 | Panigrahy et al. ........... 370/389 |
| 2006/0039372 A1* | 2/2006 | Sarkinen et al. ............. 370/389 |

OTHER PUBLICATIONS

Brenner, "Extending APL for pattern matching", IBM T. J. Watson Research Center 1983, pp. 275-280.

Cohen, "An n-gram Hash and Skip Algorithm for Finding Large Numbers of Keywords in Continuous Text Streams," Software—Practice and Experience, 1998, pp. 1605-1635, vol. 28, John Wiley & Sons, Ltd.

Cohen, "Hardware-assisted algorithm for full-text large-dictionary string matching using n-gram hashing," Information Processing & Management, 1998, pp. 443-464, vol. 34, Elsevier Science, Ltd., Great Britain.

International Search Report from corresponding PCT/US06/33123.

* cited by examiner

METHOD AND SYSTEM FOR REASSEMBLING PACKETS PRIOR TO SEARCHING

TECHNICAL FIELD OF THE INVENTION

The present invention relates to content search engines applied to networks utilizing communication protocols and more specifically to address methods that not only allow a content search engine to search for patterns in a single data packet but to match patterns that are broken-up or distributed in several data packets. Although the preferred communication protocol is Transmission Control Protocol (TCP), the present invention can be utilized with User Datagram Protocol (UDP) and other types of data communication protocols.

BACKGROUND OF THE INVENTION

It is known that computer networks can utilize data packets to deliver data through communication protocols. Data or information sent utilizing a communication protocol is broken, packetized, and then sent one-by-one through the network. The data packets are then received and reassembled (depacketized) by the intended recipient. The message boundaries between the data packets can either be set automatically or requested by the software application. Currently, the two most common types of data communication protocols include User Datagram Protocol (UDP), which defines and recognizes explicit message boundaries and Transmission Control Protocol (TCP), which does not utilize message boundaries and is also called a stream oriented protocol.

For example, when utilizing TCP, a payroll application does not mark the boundaries between employee records or identify the contents of a data stream as being payroll data. TCP views the data stream as a sequence of octets or bytes that it divides into data packets for transmission between TCP computer systems each having at least one computer. The TCP data packet (segment) is a unit of transfer between two computers or computer systems. The TCP system packetizes and sends data one packet (segment) at a time in a variety of sizes. Consequently, a data stream can be broken-up and delivered over a computer network in such a manner that can make it difficult, if not impossible, for a software application to process the data without having to reassemble several consecutive data packets, or all of the data packets, that belong to a single communication protocol connection. When data packets are separated and independently transmitted, additional problems are created since the data packets can get lost, dropped, and even arrive out-of-order.

There are content search engines, content filters, virus detectors, and worm detectors that look for a particular pattern or signature in a data stream by looking at each individual data packet one at a time. In using these search methods, a pattern or signature can be undetected if it is broken-up into several pieces and distributed in more than one data packet. This can occur either by coincidence or maliciously by someone that wants to evade detection.

The firewalls that are currently being utilized to filter data packets do so based on specific entries of the header that are configured statically based on well-known port numbers and/or addresses to allow specific software applications to send and receive the data. However, if the same software application dynamically, rather than statically preconfigured, negotiates further to use other port numbers and/or communication protocol addresses, then the firewall needs to deeply inspect each data packet so that negotiated port numbers and addresses are recognized properly. This deep packet inspection requires the system to first logically track the connection state by recognizing specific entries of headers at multiple levels, e.g., L3-L7, as well as data payloads in a deep inspection that also reviews the communication protocol connection state. Second, there is a requirement to selectively search data or patterns, whose eligibility is determined by a particular communication protocol connection state. Consequently, deep packet inspection requires packet reassembly and total control of the reassembly process. Regardless of the stream of data or pattern being searched, computer systems that depend on data packets for delivery need to reassemble corresponding data packets in sequential order to fully comprehend the logical nature and structure of the traffic.

Therefore, the packet reassembly process is resource driven but is not necessarily complicated. Nevertheless, the process is time consuming, requires computing power, and can potentially be vulnerable to Denial of Service (DoS) attacks. Therefore, it is important to find an effective and secure method to reassemble data packets. The present invention is directed to overcoming one or more of the problems set forth above.

SUMMARY OF INVENTION

The present invention provides an innovative and efficient system as well as process for systematically reassembling consecutive and adjacent data packets that belong to a single communication protocol connection at high, e.g., gigabit, speed that result in data streams capable of being processed by any software application that requires pattern matching capability. An illustrative, but nonlimiting, example of a communication protocol that transmits data packets includes Transmission Control Protocol/Internet Protocol (TCP/IP), which is actually a suite of communications protocols that is used to connect hosts on a global computer network, e.g., Internet. Transmission Control Protocol/Internet Protocol (TCP/IP) is a stream-based protocol that transmits data utilizing Nagel's Algorithm, which splits the data into data packets of various sizes. Illustrative, but nonlimiting, examples of these types of pattern matching software applications include content search engines, a filter for an address such as a Uniform Resource Locator (URL) that defines the route to a file on a server for a global computer network, e.g., Internet, a virus detector, a worm detector, an intrusion detection system, and so forth. This present invention utilizes communication protocol information to ascertain adjacent data packets so that the associated payload data can be selectively searched.

An illustrative, but nonlimiting, example of communication protocol information can include a destination address, a destination port number, a source address, a source port number, and a type of protocol. When data packets are deemed to be adjacent based on communication protocol information, the incoming packet payload data and stored packet payload data are combined, and in some cases truncated, with the total length of the payload information stored in a buffer having a length that is one character less than maximum number of characters utilized in characterizing a signature. Subtracting one (1) character ensures that all signatures broken-up into more than one packet will be detected. This provides a data stream of adjacent data packet payloads so that searching for signatures that extend across data packet boundaries can be accomplished.

An aspect of the present invention is that unique communication protocol information is precisely identified so that adjacent data payloads can be combined for searching. Another aspect of the present invention includes exclusion filtering that provides additional protection against Denial of Service (DoS) attacks and algorithm complexity attacks by routing data packets so that they bypass the reassembly process based on predetermined criteria provided by flags and other conditions.

Still another aspect of the present invention is the utilization of times so that data packets in the system that have aged for a predetermined time period can be flushed from the system so that Denial of Service (DoS) attacks and algorithm complexity attacks can be deterred.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention. For example, the invention can be applied to virtually any type of communication protocol that transmits data packets and not just Transmission Control Protocol (TCP).

Figure 1:
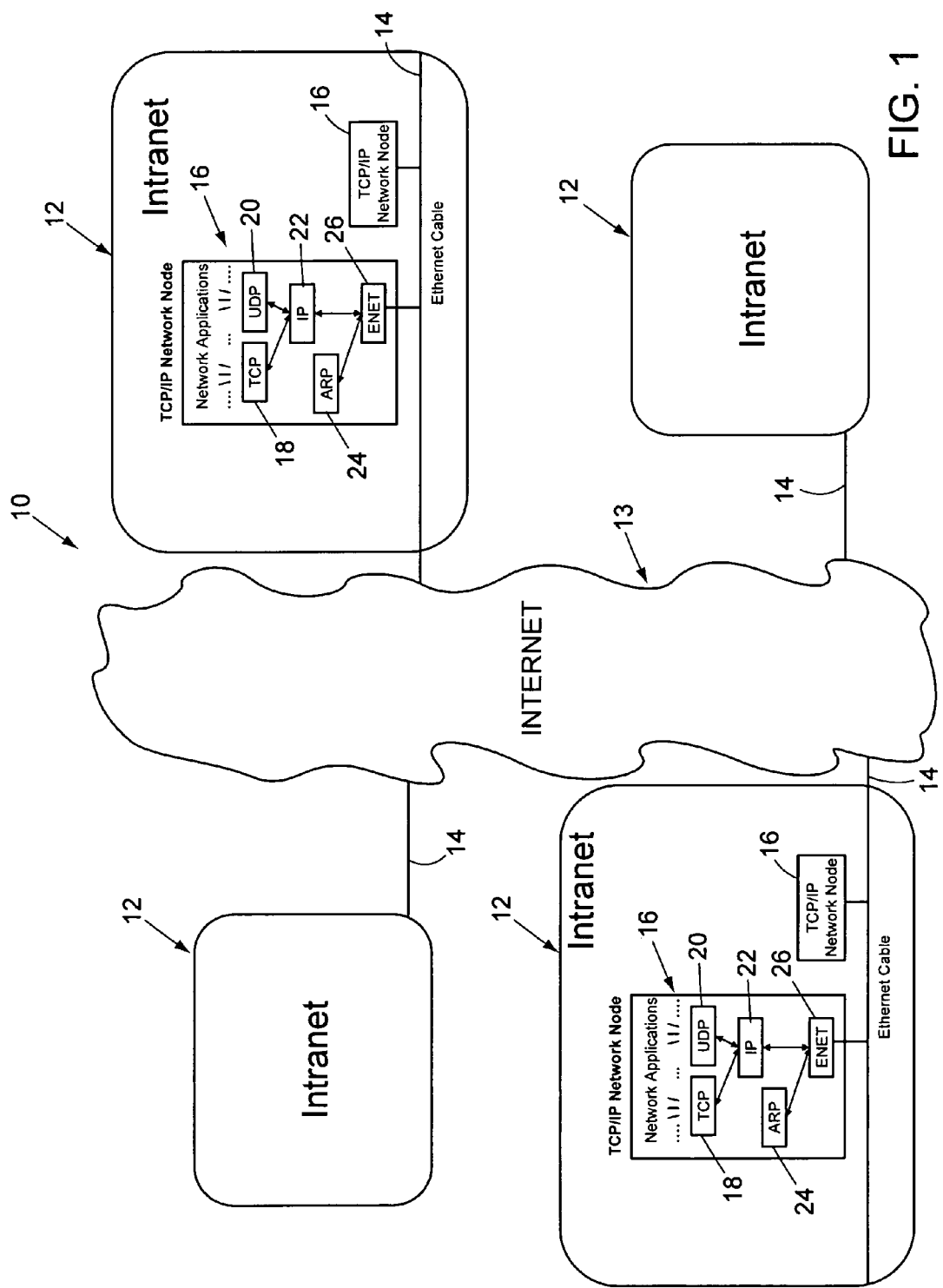
FIG. 1 illustrates an exemplary schematic diagram of an illustrative data packet-oriented computer network that can be utilized with the present invention.

Referring to the accompanying drawings in which like reference numbers indicate like elements and initially referring to FIG. 1, which is an illustrative, but nonlimiting, data packet oriented computer network that can be utilized with the present invention, which is generally indicated by numeral 10. There are a plurality of intranet systems generally indicated by numeral 12 that are connected to a global computer network 13, e.g., Internet, via an electrical connector 14, e.g., Ethernet cable. The intranet systems are each a network based on communication protocols belonging to an organization and accessible only by the organization's members, employees, or others with authorization within a firewall surrounding each intranet to fend off unauthorized access. An illustrative, but nonlimiting, component of each intranet system 12 can include a communication protocol network node 16, e.g., TCP/IP.

A communication protocol network node 16 may include an Ethernet (ENET) 26 connected to the electrical connector or cable 14. Although the Ethernet (ENET) 26 is preferred since it is the most widely used local area network (LAN) access method, which typically has a star configuration with a hub or switch in the middle, a wide variety of other types of computer networks may suffice. The Ethernet (ERN) 26 is in electronic communication with an Address Resolution Protocol (ARP) function 24, which is a communication protocol, e.g., TCP/IP, utilized to obtain a node's physical address. A client station broadcasts an ARP request onto the network with the IP address of the target node of which there is a desire to communicate, and the node with that address responds by sending back its physical address so that data packets can be transmitted. The Ethernet (ERN) 26 is also in electronic communication with an Internet Protocol (IP) 22, which is the network layer protocol that is in electronic communication with data packet transmission protocols such as, but not limited to, User Datagram Protocol (UDP) 20 and Transmission Control Protocol (TCP) 18.

Figure 2:
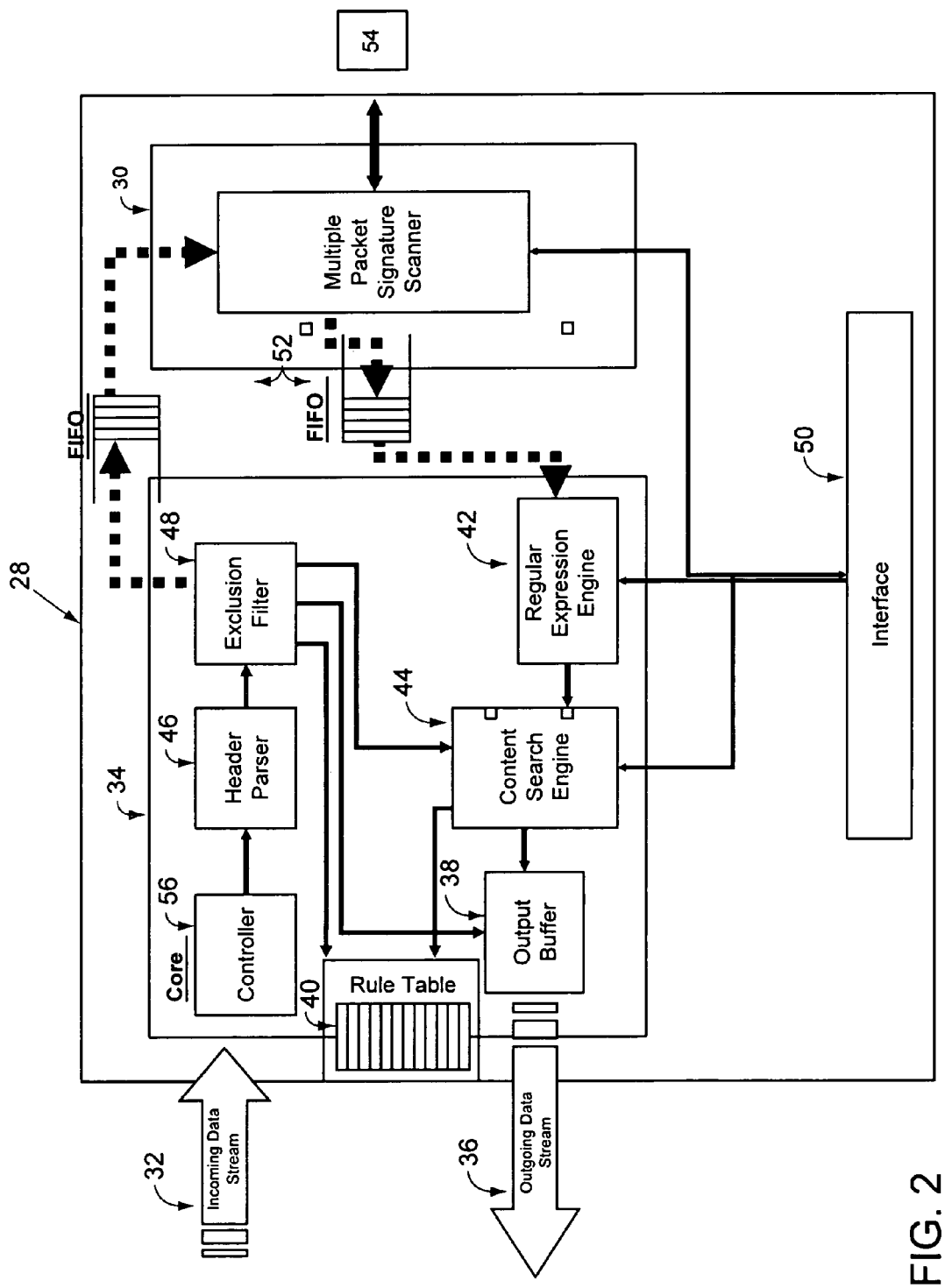
FIG. 2 illustrates an exemplary schematic diagram of a preferred embodiment of a multiple packet signature scanning system associated with the present invention.

Referring now to FIG. 2, which illustrates a schematic view of a preferred embodiment of a multiple packet signature scanning system associated with the present invention and is generally indicated by numeral 28. Although other types of data packet transmission protocols may be utilized such as User Datagram Protocol (UDP), the utilization of Transmission Control Protocol (TCP) is preferred. Other data communication protocols include, but are not limited to, AEP, AMTP, ATP, CUDP, IL, NBP, NetBEUI, RTMP, SMB, SPX, SCTP, and RTP.

There is an incoming data stream 32 that is received by a hardware module or core that is generally indicated by numeral 34 and includes, but is not limited to, a controller 56, a header parser 46, an exclusion filter 48, a regular expression engine 42, a content search engine 44 and an output buffer 38.

The incoming data stream 32 upon entering the hardware module 34 is received by the controller 56. An illustrative, but nonlimiting, example of a controller 56 is a Gigabit Ethernet Media Access Controller (MAC). After the data stream is received by the controller 56, the data stream is passed to a header parser 46. The header parser 46 extracts and parses the header information from each data packet in the data packet stream. The parsed data then passes into an exclusion filter 48. The exclusion filter 48 will filter the parsed data based on a variety of predetermined criteria that is located in a rule table 40. Illustrative, but nonlimiting, examples of this criteria can include a destination communication protocol address, flag, and/or destination communication protocol port number. The filtered data stream that fulfills this criterion will be forwarded and processed by the multiple packet signature scanner 30 while the filtered data stream that does not fulfill this criterion will be passed directly into an output buffer 38 that is scheduled for outgoing delivery with the outgoing data stream 36 to a computer network interface.

If two data messages cross two different domains with a different processing speed, there will be a need for a synchronization of the reading and writing phase. This is termed a "reader and writer" problem. Reading and writing synchronization ensures that one domain is not writing data too fast to overwrite and overflow into the next domain with data and also ensures that the reading process does not occur too fast so that the data is unavailable (unwritten). Therefore, a first-in, first-out (FIFO) queue buffer 52 is utilized as an effective and efficient solution. Based on the logical information provided in the incoming data stream 32, the multiple packet signature scanner 30 classifies and sequentially rearranges an incoming data packet with previously received data packets. The multiple packet signature scanner 30 is preferably connected to an external memory 54.

The rearranged data packets made by the multiple packet signature scanner 30 are now correctly sequenced and suitable for processing by a regular expression engine 42 and/or a content search engine 44. Basically, a regular expression engine 42 operates to find text that falls into specific patterns. An illustrative, but nonlimiting, example of a content search engine is disclosed in U.S. Patent Application No. 20030208487, which was published on Nov. 6, 2003 and is incorporated herein by reference.

The multiple packet signature scanner 30, a regular expression engine 42 and the content search engine 44 can be dynamically configured from a host using an interface 50, e.g., computer processing unit, to determine whether the multiple packet signature scanner 30 needs to handle out-of-order and retransmitted data packets. Also, the multiple packet signature scanner 30 can be configured to send a notification signal to the host through the interface 50 or other devices if exceptional security issues arise such as an attempt to exhaust memories, buffers, and other data storage devices, which can lead to a Denial of Service (DoS) attack.

Figure 3:
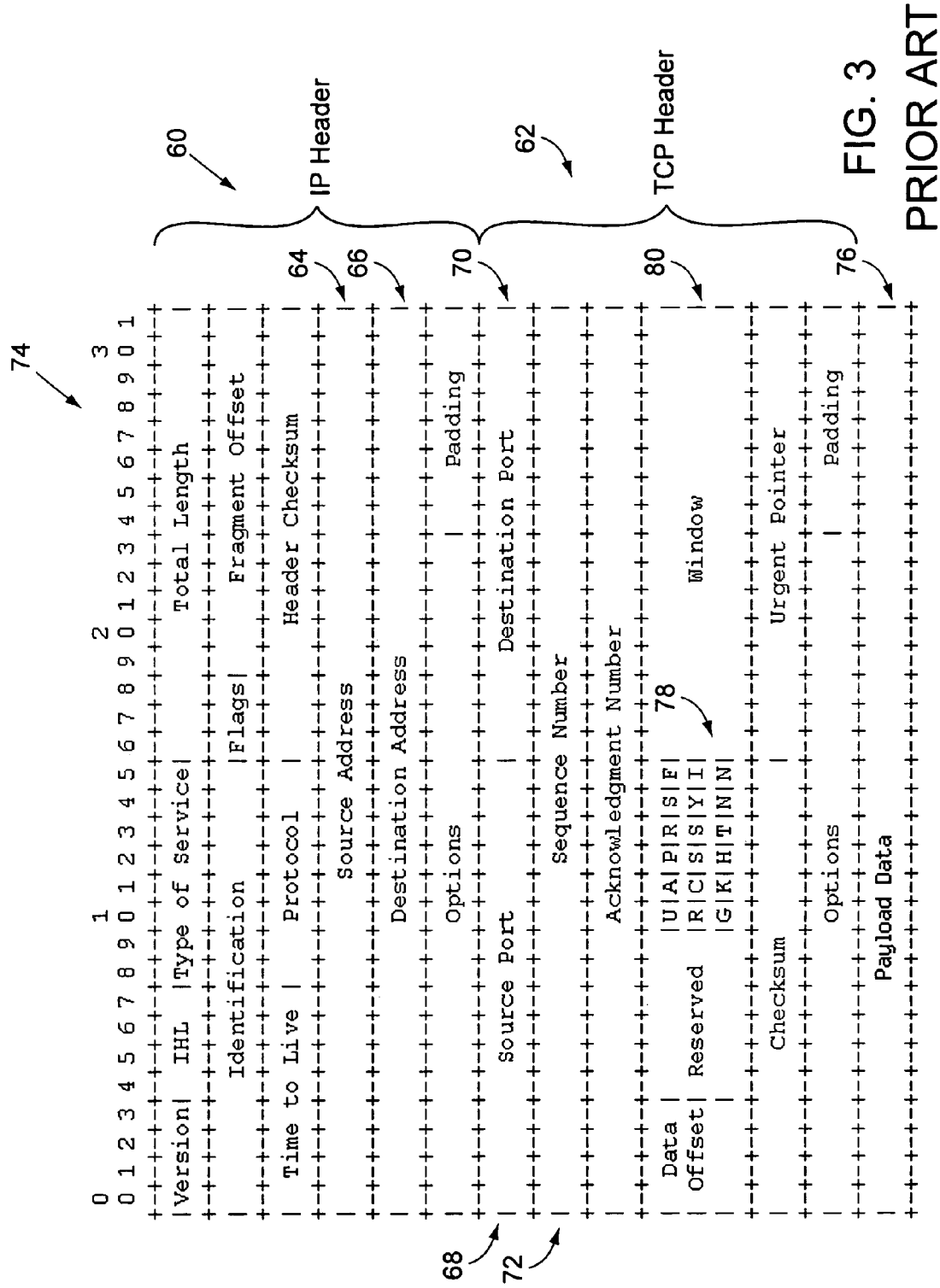
FIG. 3 illustrates an exemplary schematic diagram of a TCP packet on a bit level.

Referring now to FIG. 3, which is a logical structure of a data packet on a bit level that is generally indicated by numeral 74. An illustrative, but nonlimiting, example of a communication protocol that can be utilized by this exemplary data packet is TCP/IP. Every incoming data packet that is part of the incoming data packet stream 32, as shown on FIG. 2 of a proper TCP/IP connection, which enters the multiple packet signature scanner 30 contains a valid Internet Protocol (IP) header 60 and most likely a valid TCP header 62 as well. In addition to other information, the IP header 60 contains an Internet Protocol (IP) source address 64 (abbreviated as SRCIP) that is typically 32 bits in length and Internet Protocol (IP) destination address 66 (abbreviated as DESTIP) that is also typically 32 bits in length.

The TCP header 62 typically contains a TCP source port number 68 (abbreviated as SPORT) that is typically 16 bits in length, a TCP destination port number 70 (abbreviated as DPORT) that is typically 16 bits in length and a TCP sequence number 72 (abbreviated as TSEQN) that is typically 32 bits in length. The Transmission Control Protocol (TCP) provides reliable connections between clients and servers. A TCP connection is established between a client and a given server. The client can exchange data with the server across the TCP connection and then terminate the TCP connection. The TCP allows multiple application programs on a given computer or computer system to communicate concurrently and to demultiplex incoming TCP data packets among software programs in a single computer. Therefore, TCP utilizes the TCP destination port number 70 (DPORT) together with the Internet Protocol (IP) destination address 66 (DESTIP) to uniquely identify the ultimate destination in the computer. The combination of the TCP destination port number 70 (DPORT) and the Internet Protocol (IP) destination address 66 (DESTIP) is referred to as the destination endpoint. This is also true for the source endpoint, which is the combination of the TCP source port number 68 (SPORT) and the Internet Protocol (IP) source address 64 (SRCIP). The TCP connections are identified by a pair of endpoints, i.e., (TCP source port number 68 (SPORT), Internet Protocol (IP) source address 64 (SRCIP)) and (TCP destination port number 70 (DPORT), Internet Protocol (IP) destination address 66 (DESTIP)).

In the transmission of data packets, TCP views the data stream as a sequence of bytes that are divided into packets or segments for transmission. The TCP sequences the data by associating the TCP sequence number 72 (TSEQN) with every byte that is transmitted. For example, an application may write 4096 bytes to a TCP connection, causing the TCP to send four segments. A segment is defined as a unit of data that is sent and received in a single data packet. In an illustrative, but nonlimiting example, the first segment can contain data with sequence numbers 1-1024, the second segment can contain data with sequence numbers 1024-2048, the third segment can contain data with sequence numbers 2048-3072, and the fourth segment can contain data with sequence numbers 3072-4096. The TCP sequence number 72 (TSEQN) identifies the position in the sender's byte stream of the data in the segment. The data that may potentially carry a signature or a portion of a signature is located in payload data that is identified by numeral 76. There are also a series of flags to indicate the communication protocol connection state 78, e.g., URG, ACK, PSH, RST, SYN, and FIN, as well as a protocol communication connection, e.g., TCP, window 80.

A very important feature of the multiple packet signature scanning system 28 is the efficient reassembly of segments in a manner so that malicious patterns or signatures, which are indicative of viruses or worms, can be reconstructed regardless of whether they are located in a single data packet or distributed over several data packets. Moreover, the detection of patterns also occurs in the content searching engine 44 and the regular expression engine 42. The reconstruction of patterns requires a deliberate reassembly of the segments.

Figure 4:
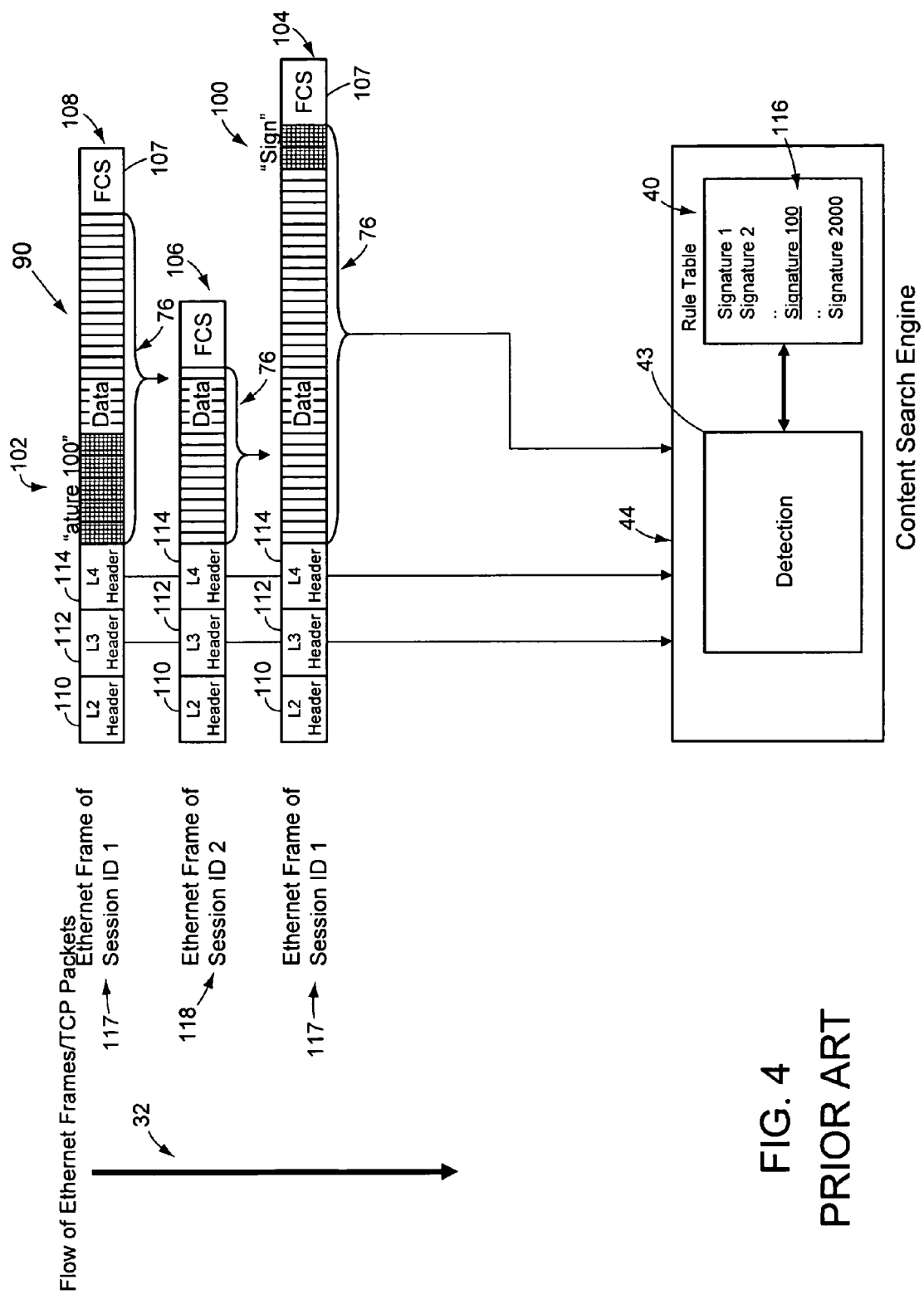
FIG. 4 illustrates an exemplary schematic diagram of a high level view of three (3) representative data packets entering a content search engine.

FIG. 4 illustrates a schematic diagram, which is generally indicated by numeral 90, of a high level view of three (3) representative packets entering the multiple packet signature scanning system 28. The incoming data stream 32, as is also shown in FIG. 1, flows in the form of a data packet, e.g., Ethernet frame, into the multiple packet signature scanning system 28. For example, Ethernet frames 104, 106, and 108 enter the multiple packet signature scanning system 28 and each of them contain an L2header 110, which is associated with the Ethernet frame, an L3 header 112, which is associated with the TCP header 62.There is a serial bit stream being transmitted with a Fast Frame Check Sequence (FCS) 107 that is calculated over the serial data as the serial data goes out. The complement of the resulting Fast Frame Check Sequence (FCS) 107 is then appended to the serial stream, followed by a flag sequence. A pattern results when this operation passes over a complement of the Fast Frame Check Sequence (FCS) 107 to indicate a good data packet, e.g., Ethernet frame. This is utilized for error detection.

The first entering Ethernet frame 104 contains a string "Sign" 100 in the payload data 76. Furthermore, the Ethernet frame 104 will be parsed and the result of this parsing is that the payload data 76 is extracted and feed into the content search engine 44. The rule table 40 is operatively connected to the content engine 44, which contains patterns of characters to be searched such as "Signature 1," "Signature 2", "Signature 100," and so forth. The payload data 76 of the first entering Ethernet frame 104 will pass through the multiple packet signature scanning system 28, as shown in FIG. 2, undetected since there was no pattern that was matched and a complete pattern found in the rule table 40 is not detected with the detection mechanism 43 of the content search engine 44 in the payload data 76.

The second entering Ethernet frame 106 does not contain any portion of a character pattern in the payload data 76 and is processed in the same manner. Furthermore, the Ethernet frame 106 will be parsed and the result of this parsing is that the payload data 76 is extracted and feed into the content search engine 44. The rule table 40 is operatively connected to the content engine 44, which contains patterns of characters to be searched such as "Signature 1," "Signature 2", "Signature 100," and so forth. Therefore, this second entering Ethernet frame 106 will also pass through the multiple packet signature scanning system 28, as shown in FIG. 2, undetected since no pattern found in the rule table 40 was detected with the detection mechanism 43 of the content search engine 44 in the payload data 76.

The third entering Ethernet frame 108 is processed in the same manner. This third entering Ethernet frame 108 is also parsed and the result of this parsing is that the payload data 76 is extracted and fed into the content search engine 44. This third entering Ethernet frame 108 contains a string "ature 100" 102 in the payload data 76. As previously stated, this content search engine 44 is operatively connected to the rule table 40 and allows the content search engine 44 to search for the previously defined patterns searched such as "Signature 1", "Signature 2", "Signature 100", and so forth. Therefore, this third entering Ethernet frame 108 will also pass through the multiple packet signature scanning system 28, as shown in FIG. 2, undetected since a complete pattern found in the rule table 40 is not detected with the detection mechanism 43 of the content search engine 44 in the payload data 76.

Figure 5:
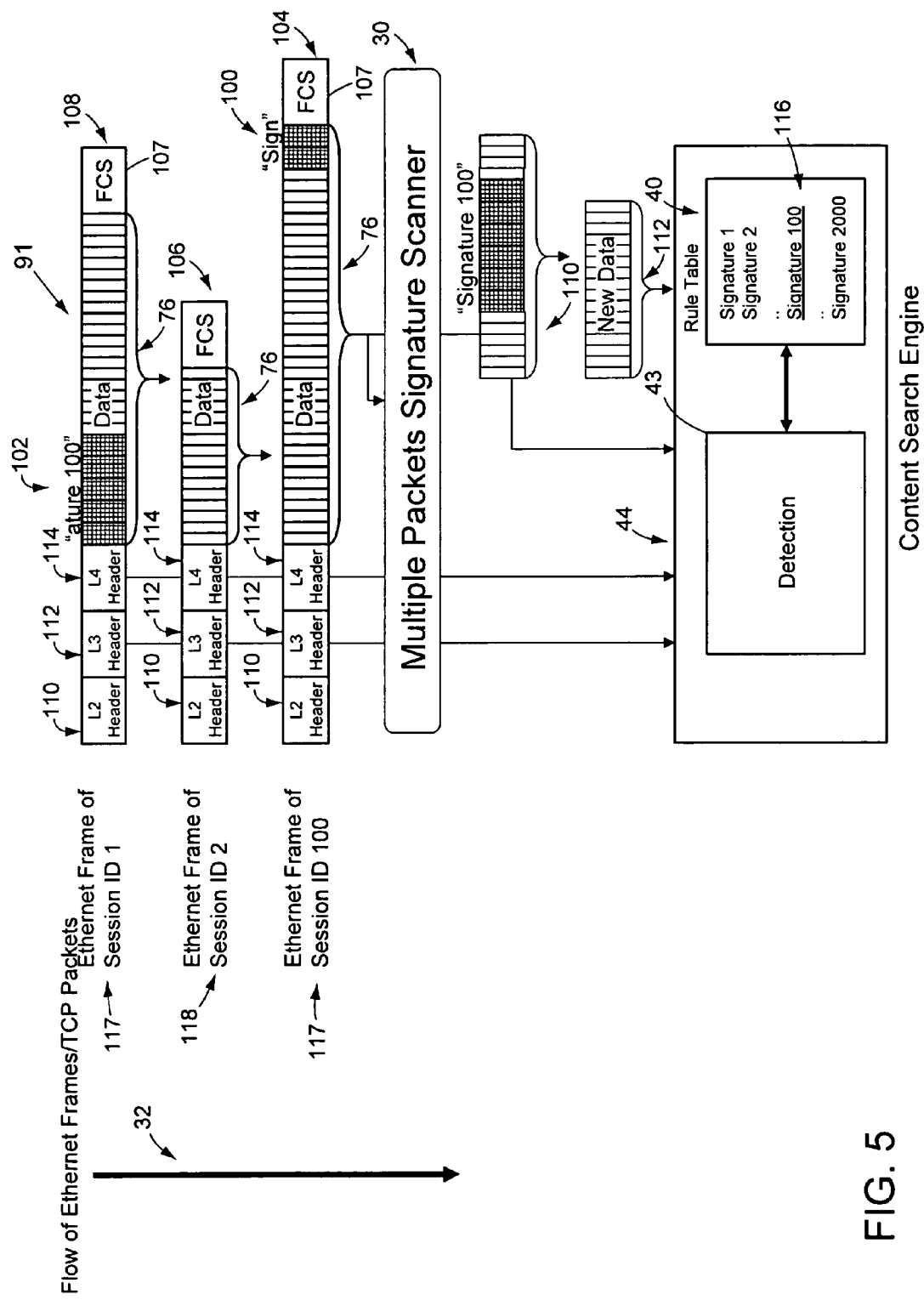
FIG. 5 illustrates an exemplary schematic diagram of a high level view of three (3) representative data packets, such as that shown in FIG. 4, entering a multiple packet signature scanning system in accordance with the present invention.

Referring now to FIG. 5, this is virtually the same schematic diagram as shown in FIG. 4 and is generally indicated by numeral 91. FIG. 5 is a high level view of three (3) representative packets entering the multiple packet signature scanning system 28 with the inclusion of the multiple packet signature scanner 30, previously shown in FIG. 2, and is positioned to receive the incoming Ethernet frames 104, 106 and 108 prior to delivery to the content search engine 44.

However, each of the entering Ethernet frames 104, 106, and 108 are identified by a protocol connection, e.g., Transmission Control Protocol (TCP), by the multiple packet signature scanner 30. For example, the first entering Ethernet frame 104 and the third entering Ethernet frame 108 are both identified by the same protocol connection 117 as Session ID 1 and the second entering Ethernet frame 106 is identified by protocol connection 118 as Session ID 2. Therefore, if the payload data 76 from the same protocol connection is concatenated between the payload data 76 of the first entering Ethernet frame 104 and the third entering Ethernet frame 108, then the result would contain the pattern "Signature 100" 110 which would have matched an entry 116 in the rule table 40 and would have been positively identified by the content engine 44.

Other payload data 76 from the second entering Ethernet frame 106 and identified by protocol connection 118 is identified by numeral 112 and can be entered into the content search engine 44 for an unsuccessful search.

Figure 6:
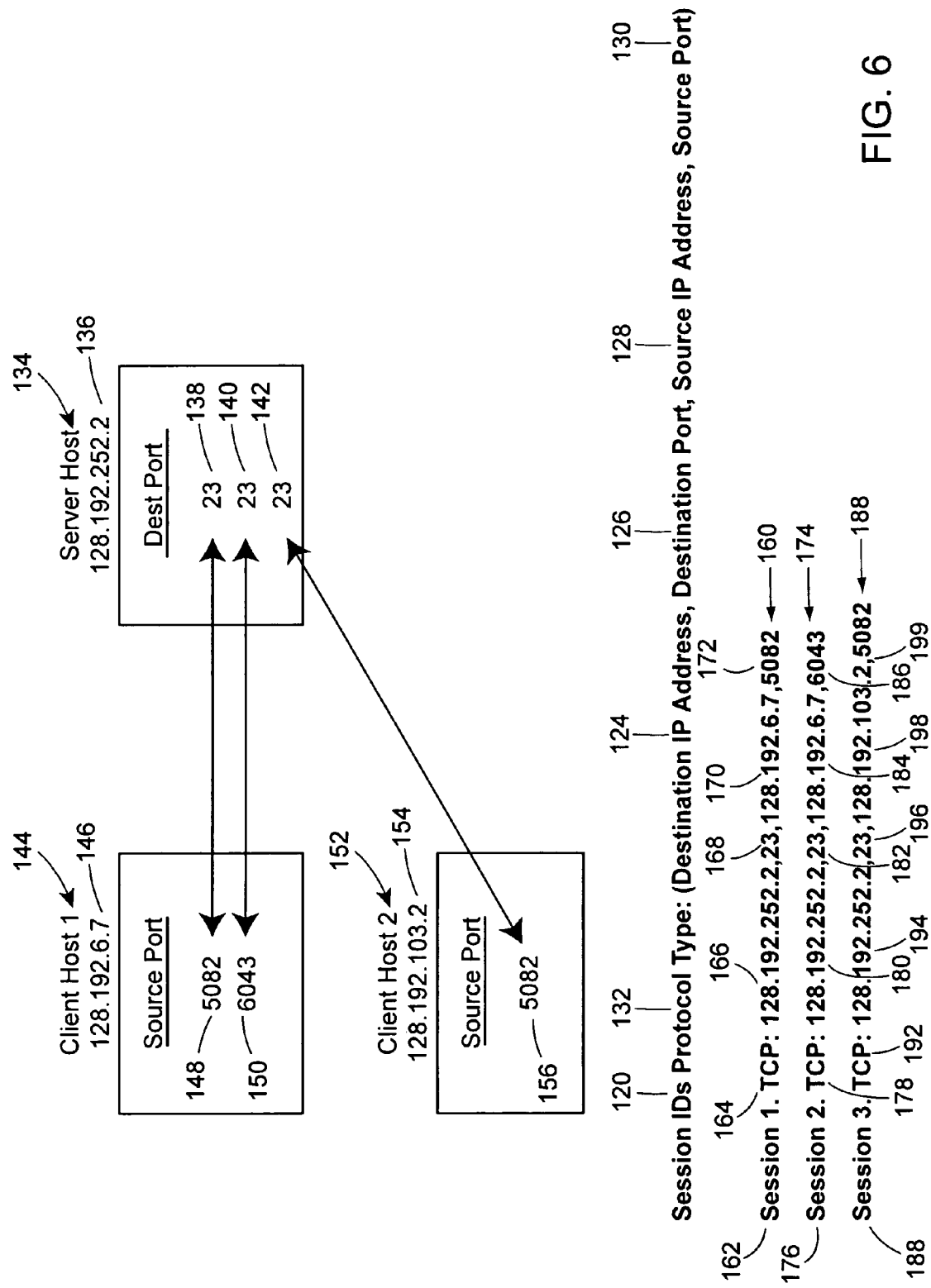
FIG. 6 illustrates an exemplary schematic diagram of protocol connection information utilized to indicate related entering Ethernet frames.

Referring now to FIG. 6, the protocol connection, e.g., Session ID, is used to indicate related entering data packets, e.g., Ethernet frames, as indicated by numeral 120. The Session ID 120, when used in an illustrative, but nonlimiting, TCP connection, is a unique identification that is a combination (tuple) of a destination IP address 124, a destination port number 126, a source IP address 128, a source port number 130, and a type of protocol 132, e.g., TCP. In this illustrative, but nonlimiting example, there is a server host 134 with an IP address 136 and three destination ports 138, 140, and 142. There is a first client host 144 with an IP address 146, a first source port 148, and a second source port 150. Also, there is a second client host 152 with an IP address 154 and a source port 156.

Any combination (tuple) of destination IP address 124, destination port number 126, source IP address 128, source port number 130 and type of protocol 132, e.g., TCP, can provide a unique identification that can be utilized to ascertain if data packets are adjacent.

The first exemplary communication protocol connection is indicated by numeral 160. The Session ID is indicated by numeral 162 as "Session 1" and the protocol type is indicated by numeral 164 as "TCP." The destination IP address 166 is from the IP address 136 of the server host 134, the destination port number 168 is also from the server host 134 and indicated by numeral 138, the source IP address 170 is from the IP address 146 for the first host client 144, and the source port number 172 is from the source port number 148 from the first host client 144.

The second exemplary communication protocol connection is indicated by numeral 174. The Session ID is indicated by numeral 176 as "Session 2" and the protocol type is indicated by numeral 178 as "TCP." The destination IP address 180 is from the IP address 136 of the server host 134, the destination port number 182 is also from the server host 134 and indicated by numeral 140, the source IP address 184 is from the IP address 146 for the first host client 144, and the source port number 186 is from the source port number 150 from the first host client 144.

The third exemplary communication protocol connection is indicated by numeral 188. The Session ID is indicated by numeral 190 as "Session 3" and the protocol type is indicated by numeral 192 as "TCP." The destination IP address 194 is from the IP address 136 of the server host 134, the destination port number 196 is also from the server host 134 and indicated by numeral 142, the source IP address 198 is from the IP address 152 for the second host client 154, and the source port number 199 is from the source port number 156 from the second host client 152.

Consequently, in order for a content search engine 44 to recognize a pattern in a string, there must be a mechanism to determine if the communication protocol connection for at least two data packets are consecutive. As shown in FIG. 3, the packet's header information 74 determines if two or more data packets are consecutive or not. Therefore, the multiple packet signature scanner 30 operates as a mechanism to reconstruct information from multiple data packets with the intention to discover patterns or signatures that may be broken-up and distributed in more than one data packet.

Figure 7:
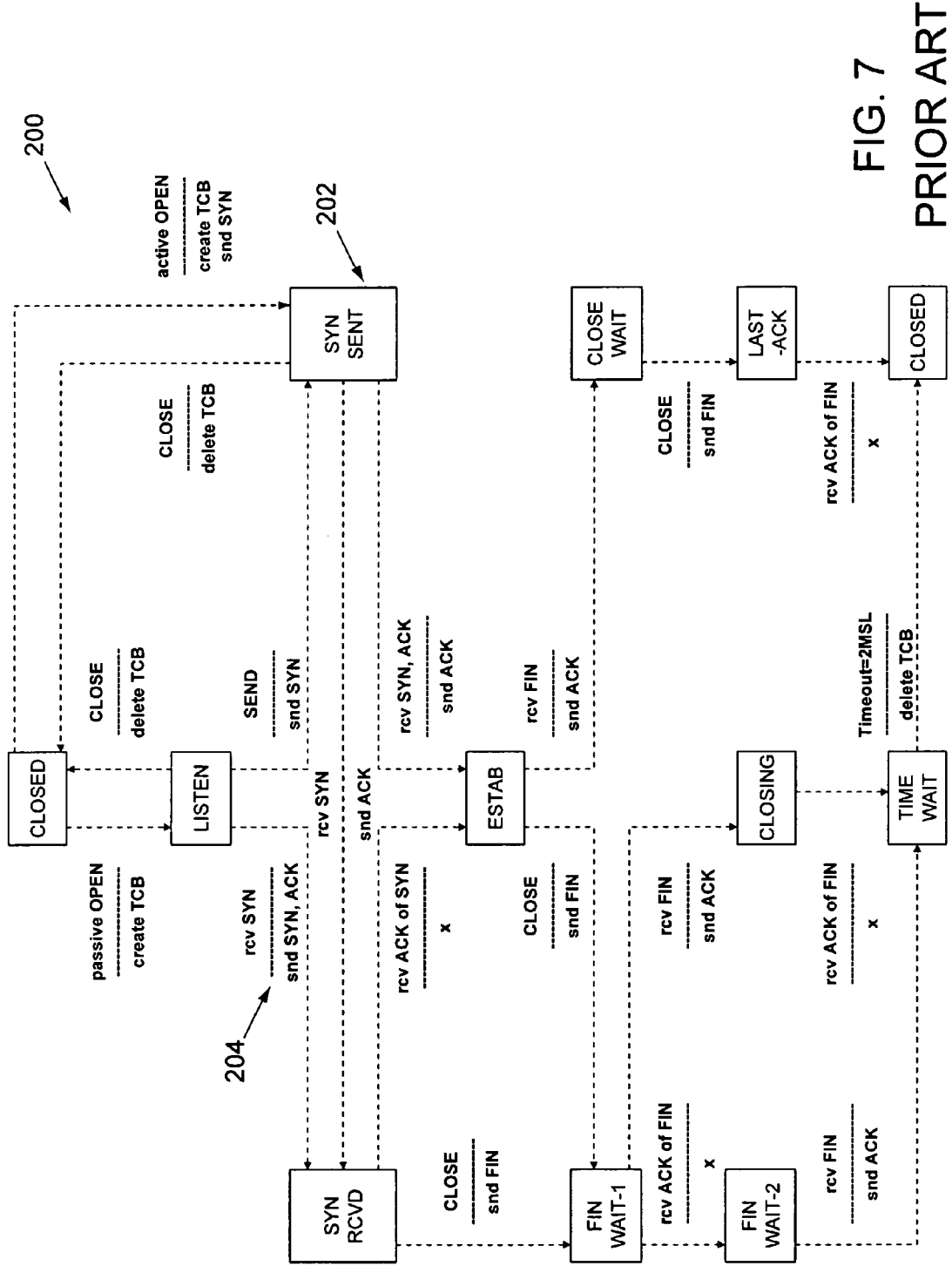
FIG. 7 illustrates an exemplary connection state diagram for Transmission Control Protocol (TCP)

As previously stated, the protocol transmission connection, e.g., TCP, is uniquely identified by the combination (tuple) of destination IP address 124, destination port number 126, source IP address 128, source port number 130 and type of protocol 132, e.g., TCP. As shown in FIG. 7, a standard and known connection state diagram for Transmission Control Protocol (TCP) is generally indicated by numeral 200. A computer, e.g., client (host), can establish a protocol transmission connection, e.g., TCP, by sending a packet with a flag, e.g., SYN, 202. Another computer, e.g., server (host), can acknowledge the protocol transmission connection that is established by sending a flag, e.g., ACK, upon receipt of the corresponding packet with the flag SYN sent by the client host 204. The end result of this exchange of TCP packets is a TCP connection that is uniquely identified by a destination Internet Protocol (IP) address, e.g., 128.192.6.2 for a server, destination port number, e.g., assigned number in the server's machine 23, source Internet Protocol (IP) address, e.g., originating client's Internet Protocol (IP) address 128.192.6.7, and source port number, e.g., assigned number in the server's machine 5082. This specific combination (tuple) is entitled Session 1 as indicated by numeral 162 in FIG. 6 and any future data packet having this same combination (tuple) is regarded as belonging to the same connection. In order to reassemble the data packets, the multiple packets signature scanner 30, as shown in FIG. 5, stores in memory at least two consecutive data packets.

Figure 8:
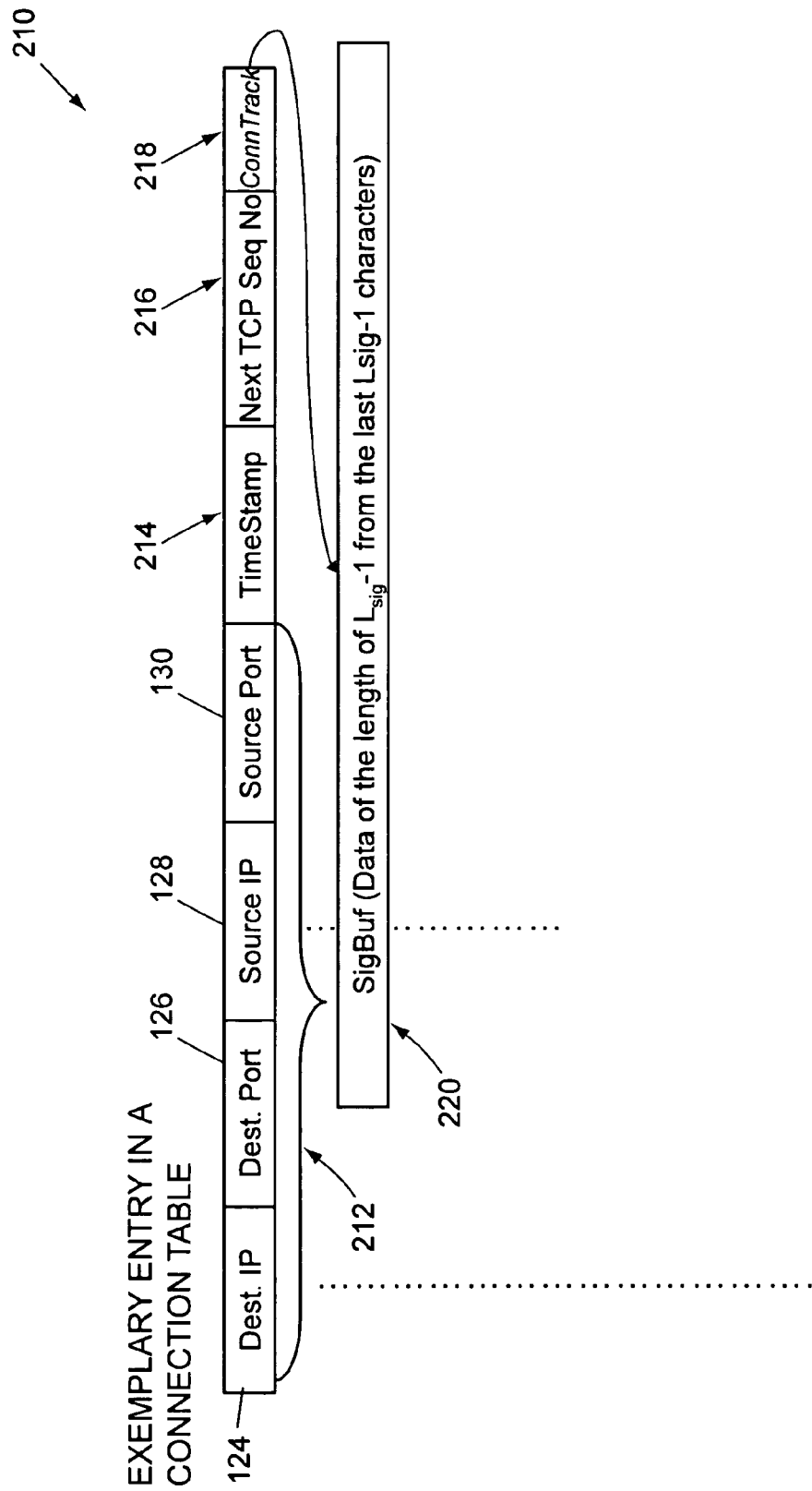
FIG. 8 illustrates an exemplary entry in a connection table including protocol connection information, a time stamp, next protocol connection number, connection tracking information and payload information stored in a memory buffer.

Referring now to FIG. 8, an exemplary entry in a connection table for the multiple packets signature scanner 30 is illustrated and is generally indicated by numeral 210. The first component is the previously described combination (tuple) 212 that includes a destination address 124, a destination port number 126, a source address 128, and a source port number 130. There is a time stamp 214 that provides a time entry to indicate when a particular protocol connection, e.g., session, has been registered or created. The purpose of the time stamp 214 is to allow the multiple packet signature scanner 30 dispose of communication protocol connections, e.g., sessions, which reside in the multiple packet signature system 28 for too long a period of time. As a result, an attempt to launch a Denial of Service (DoS) attack by creating fake communication protocol connections in order to exhaust resources can be deterred.

This is followed by a data indication of the next protocol connection, e.g., session number, 216. This should be a number that is equal or sequential to the prior protocol connection, e.g., session number. This is to determine if the next incoming packet is correct and should be the next protocol connection, e.g., session number, which should be stored in the FIFO queue buffer 52 for the multiple packet signature scanner 30, as shown in FIG. 2.

This is followed by connection tracking information 218. Connection tracking information 218 is the ability to maintain state information about a connection in memory tables, such as source and destination Internet Protocol (IP) addresses, port numbers, protocol types, connection states, and timeouts.

There is a buffer, located in the external memory 54 shown in FIG. 2, which is where communication protocol connection payload data is stored. As an illustrative, but nonlimiting example, this can be entitled "SigBuf" as is generally indicated by numeral 220. The size of this buffer 220, e.g., SigBuf, which varies, depends on the maximum number of characters utilized by the content search engine 44 in characterizing a signature from the rule table 40. An illustrative, but nonlimiting, designation for maximum number of characters utilized by the content search engine 44 in characterizing a signature from the rule table 40 can be deemed as $L_{Sig}$. The size of the buffer 220, e.g., SigBuf, will be the maximum number of characters utilized by the content search engine 44 in characterizing a signature from the rule table 40, e.g., $L_{Sig}$, minus one (1) character. Subtracting one (1) character ensures that all signatures broken-up into more than one data packet will be detected.

Figure 9:
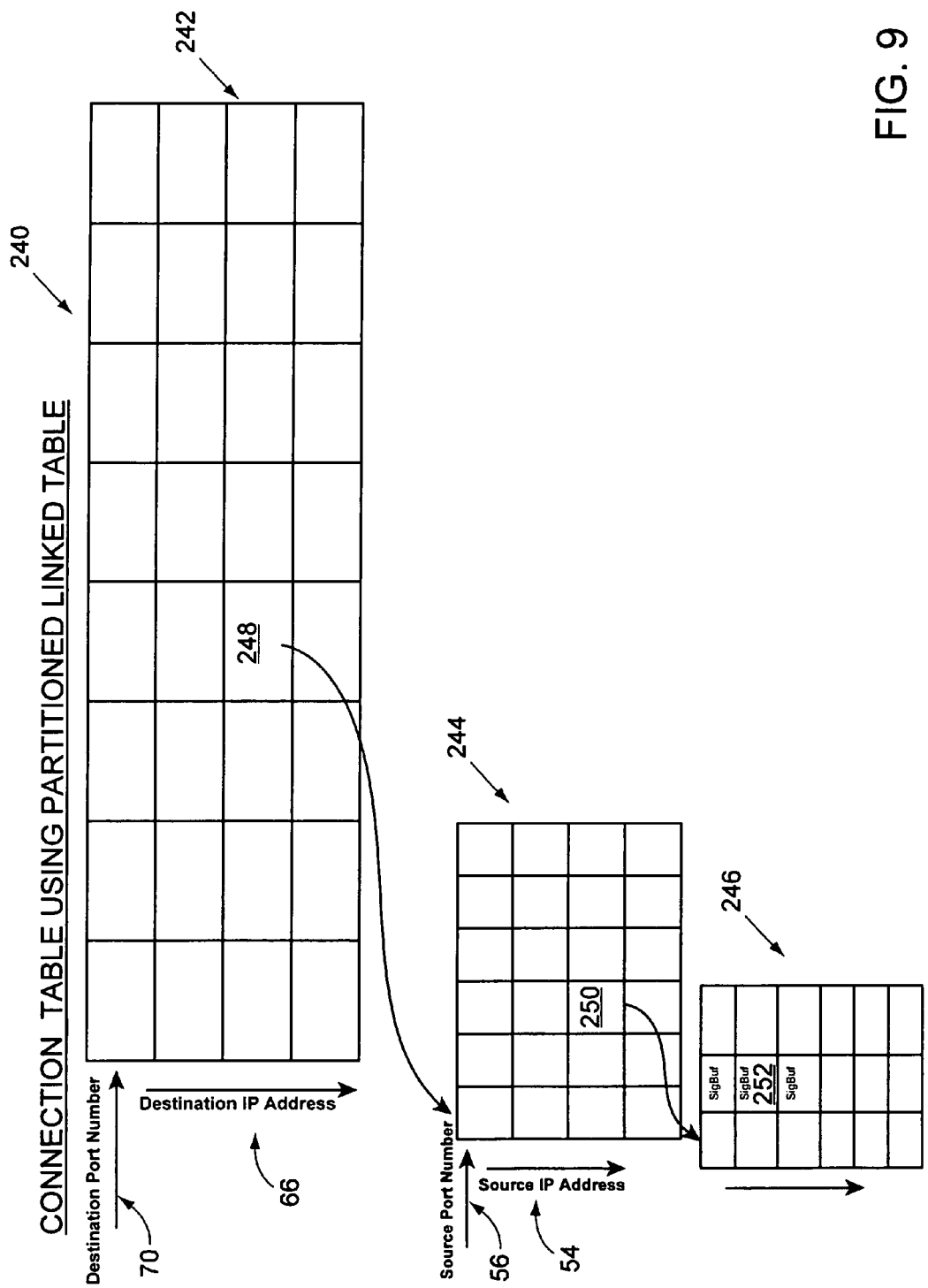
FIG. 9 illustrates an exemplary schematic diagram of partitioned-linked connection tables having three (3) levels that are associated with the present invention.

Referring now to FIG. 9, a hierarchial (partitioned) memory structure for storing communication protocol connection information within a connection table for the multiple packet signature scanner is shown and is generally indicated by numeral 240. This also includes communication protocol connection tracking information and data in the buffer 220, e.g., SigBuf, as shown in FIG. 8. There are three (3) levels of addressing associated with the hierarchial (partitioned) memory structure, referenced by numerals 242, 244 and 246, respectively.

In an illustrative, but nonlimiting example, the first level of addressing includes information regarding the destination port number 70 (DPORT), having a second predetermined length, e.g., 16 bits, and the Internet Protocol (IP) destination address 66 (DESTIP),having a first predetermined length, e.g., 32 bits. The bits for the Internet Protocol (IP) destination address 66 and the destination port number 70 are combined with a hash function to generate a unique first number 248, e.g., 32 bits. A hash function is a mathematical function that maps values from a larger domain into a smaller range, and that reduces a potentially long message into a "message digest" or "hash value", which is sufficiently compact so that it can be inputted into a subsequent algorithm.

The resulting hash value 248 is an address that points to the beginning of the second level table 244. Inside the second level table 244, the source port number 56 (SPORT) and Internet Protocol (IP) source address 54 are hashed, as previously described above, to generate a unique second number 250, e.g., 32 bits long. This unique second number 250 is the address of the third level table 246. To find the final location of the buffer 220, e.g., SigBuf, and other information, the next or anticipated protocol connection, e.g., session number, that is stored in the FIFO queue buffer 52 for the multiple packet signature scanner 30 is hashed to create a unique third number 252 representing the physical address where the information for the buffer 220, e.g., SigBuf, and other information are stored, which is the third level table 246.

Figure 10:
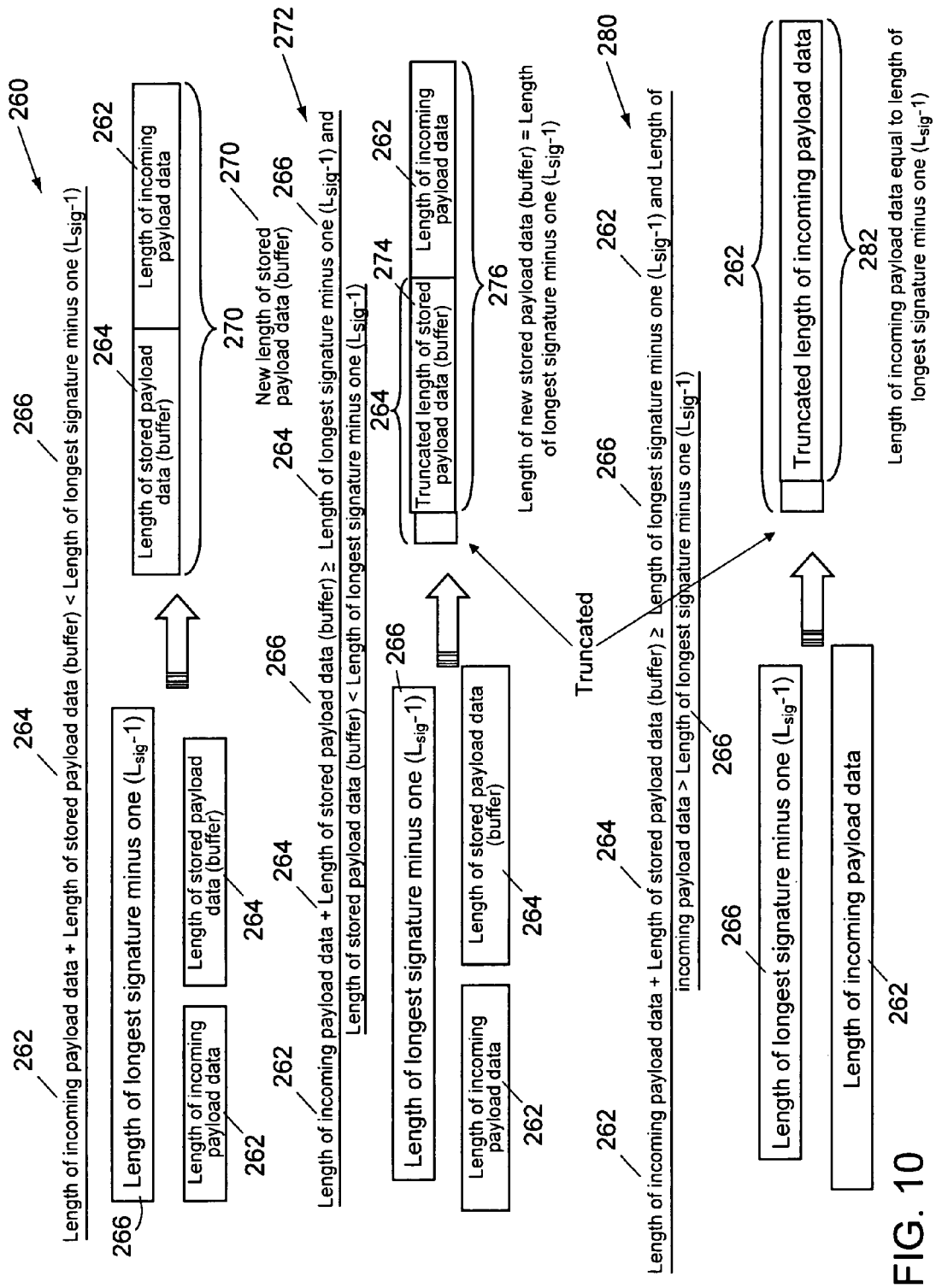
FIG. 10 illustrates an exemplary schematic diagram of payload data stored in a buffer associated with the present invention that varies based on the size of the incoming payload data, the previously stored payload data in a buffer and the length in characters of the longest signature minus one (1) character.

Referring now to FIG. 10, the minimum amount of information in the buffer 220, e.g., SigBuf, which is required for analysis by the multiple packet signature scanner 30 is explored. When scanning for patterns over multiple data packets, the multiple packet signature scanner 30 needs to store the data that is just as long as the maximum number of characters in the longest pattern stored in the rule table 40, shown in FIG. 2, which is referred to as a signature from the rule table 40, e.g., $L_{Sig}$, minus one (1) character.

Depending on the length of the payload data of the incoming data packet, there are three (3) scenarios to differentiate regarding the determination of the calculations of the number of bytes/characters that should be stored in the multiple packet signature scanner 30.

The first scenario is indicated by the equation designated by equation 260 where the sum of the length of the incoming payload data 262 and the length of the payload information stored in the buffer 264, e.g., SigBuf, is less than the maximum number of characters in the longest pattern 266 stored in the rule table 40, shown in FIG. 2, which is referred to as a "signature", e.g., LSig, minus one (1) character. The addition of the length of the stored payload data 264 and the length of the incoming payload data 262 results in the length of the incoming payload data 262 being amended (concatenated) to the length of the payload data information that is already stored in the buffer 264. This will form a new length of payload information that will be stored in the buffer 270, e.g., New SigBuf.

The second scenario is indicated by the equation designated by equation 272, where the sum of the length of the incoming payload data 262 and the length of the payload information stored in the buffer 264, e.g., SigBuf, is greater than or equal to the maximum number of characters in the longest pattern 266 stored in the rule table 40, shown in FIG. 2, which is referred to as a "signature" from the rule table 40, e.g., $L_{Sig}$, minus one (1) character in addition to the fact that the length of the payload information stored in the buffer 264, e.g., SigBuf, is less than the maximum number of characters in the longest pattern 266, e.g., "signature" stored in the rule table 40, e.g., $L_{Sig}$, minus one (1) character. The result is that the length of the stored payload data 264 will be truncated 274 from the front of the data by as much as the sum of the length of the incoming payload data 262 and the length of the payload information stored in the buffer 264, e.g., SigBuf, minus the maximum number of characters in the longest pattern 266, e.g., "signature" stored in the rule table 40, e.g., $L_{Sig}$, minus one (1) character. This will form a new length of stored payload data 276. Then the incoming payload data 262 will be appended (concatenated) to the truncated stored payload data 274 so that this sum forms a new length of payload information stored in the buffer 276, e.g., New SigBuf.

The third scenario is indicated by the equation designated by equation 280 where the sum of the length of the incoming payload data 262 and the length of the payload information stored in the buffer 264, e.g., SigBuf, is greater than or equal to the maximum number of characters in the longest pattern 266 stored in the rule table 40, shown in FIG. 2, which is referred to as a "signature" from the rule table 40, e.g., $L_{Sig}$, minus one (1) character in addition to the fact that the length of the incoming payload data 262 is greater than the maximum number of characters in the longest pattern 266, e.g., "signature" stored in the rule table 40, e.g., $L_{Sig}$, minus one (1) character. The result is that the length of the incoming payload data 262 will be truncated from the front of the data by as many as the sum of the length of the incoming payload data 262 minus the maximum number of characters in the longest pattern 266, e.g., "signature" stored in the rule table 40, e.g., $L_{Sig}$, minus one (1) character. Then the resulting data forms a new length of payload information stored in the buffer 284, e.g., New SigBuf.

Figure 11:
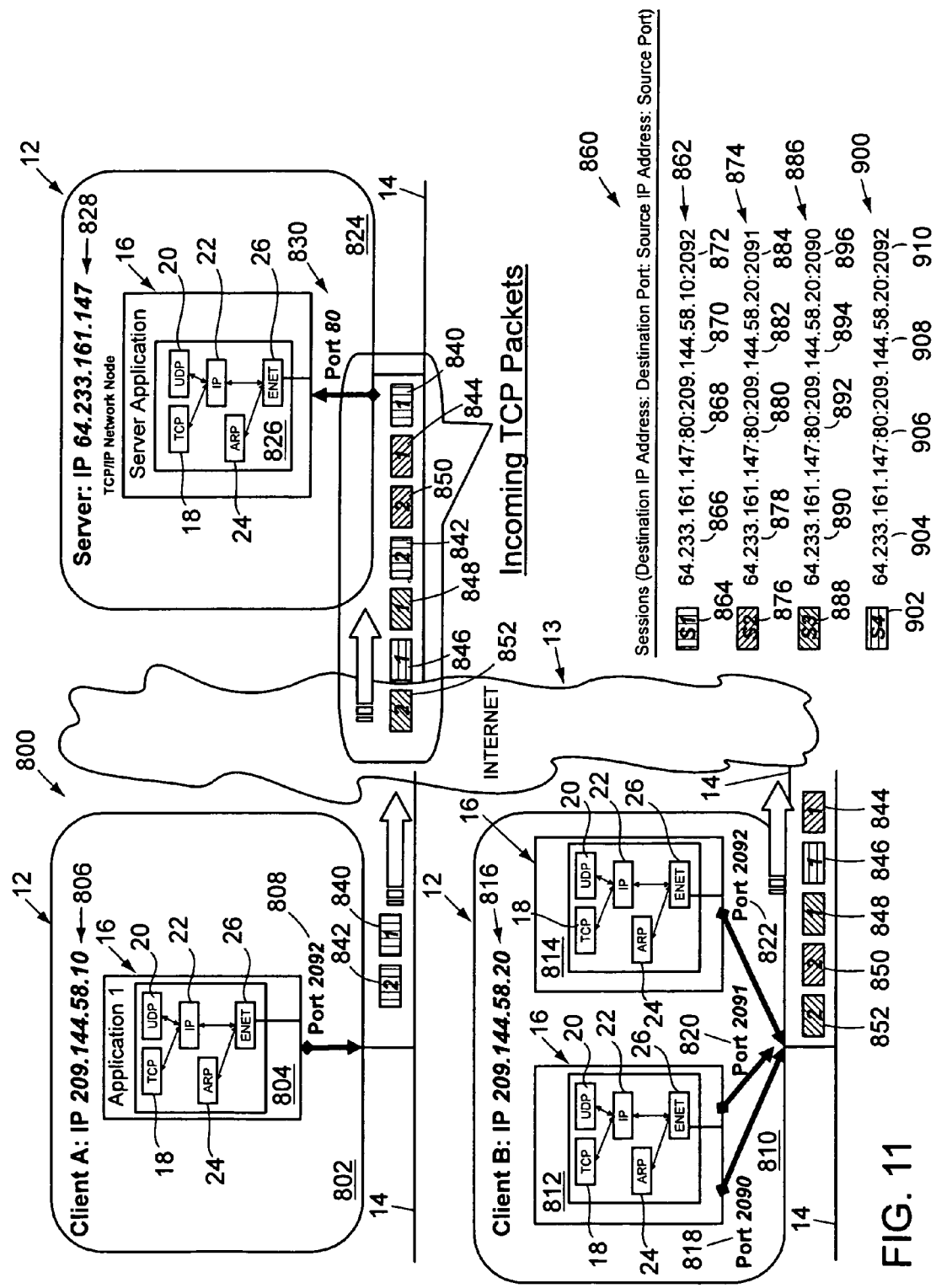
FIG. 11 illustrates an exemplary schematic diagram of an illustrative data packet-oriented computer network having multi-session communication protocol connection data packet traffic that can be utilized with the present invention.

Referring now to FIG. 11, which is directed to illustrative, but nonlimiting, representation of incoming TCP data packets that are transmitted and received in a data packet oriented computer network, which is generally indicated by numeral 800 that comports with the data packet oriented computer network 10 previously shown in FIG. 1. There are a plurality of intranet systems generally indicated by numeral 12 that are connected to a global computer network 13, e.g., Internet, via an electrical connector 14, e.g., Ethernet cable. An illustrative, but nonlimiting, component of each intranet system 12 can include a communication protocol network node 16, e.g., TCP/IP.

There is a first intranet system that is generally indicated by numeral 802 and includes a first client application communication protocol network node 804. The IP address is indicated by numeral 806, e.g., 209.144.58.10. The first client application communication protocol network node 804 includes an illustrative port number 808, e.g., 2092. This first intranet system 802 is shown transmitting a first data packet 840 and a second data packet 842.

There is a second intranet system that is generally indicated by numeral 810 and includes a second client application communication protocol network node 812 and includes a third client application communication protocol network node 814. The IP address is indicated by numeral 816, e.g., 209.144.58.20. The second client application communication protocol network node 812 includes a first illustrative port number 818, e.g., 2090, and a second illustrative port number 820, e.g., 2091. The third client application communication protocol network node 814 includes a first illustrative port number 822, e.g., 2092. This second intranet system 810 is shown transmitting a third data packet 844, a fourth data packet 846, a fifth data packet 848, a sixth data packet 850 and a seventh data packet 852.

There is a third intranet system that is generally indicated by numeral 824 and includes a server application communication protocol network node 826. The IP address is indicated by numeral 828, e.g., 64.233.161.147. The server application communication protocol network node 824 includes an illustrative port number 830, e.g., 80. The incoming data packets are received in order with the first data packet 840 received first, the third data packet 844 received second, the sixth data packet 850 received third, the second data packet 842 received fourth, the fifth data packet 848 received fifth, the fourth data packet 846 received sixth and the seventh data packet 852 received seventh.

Any combination (tuple) of destination IP address, destination port number, source IP address, and source port number can provide a unique identification that can be utilized to ascertain if data packets are adjacent, e.g., a session as generally indicated by numeral 860.

The first exemplary combination (tuple) is indicated by numeral 862. The Session ID is indicated by numeral 864 as "S1." The destination IP address 866 and the destination port number 868 are from the IP address 828 and port 830 of the server application communication protocol network node 826. The source IP address 870 and source port number 872 are from the IP address 806 and port number 808 of the first client application communication protocol network node 804. This first session "S1" includes the first data packet 840, which was received as the first incoming data packet, and the second data packet 842, as the fourth incoming data packet.

The second exemplary combination (tuple) is indicated by numeral 874. The Session ID is indicated by numeral 876 as "S2." The destination IP address 878 and the destination port number 880 are from the IP address 828 and port 830 of the server application communication protocol network node

826. The source IP address 882 and source port number 884 are from the IP address 816 and port number 820 of the second client application communication protocol network node 812. This second session "S2" includes the third data packet 844, which was received as the second incoming data packet, and the sixth data packet 850, which was received as the third incoming data packet.

The third exemplary combination (tuple) is indicated by numeral 886. The Session ID is indicated by numeral 888 as "S3." The destination IP address 890 and the destination port number 892 are from the IP address 828 and port 830 of the server application communication protocol network node 826. The source IP address 894 and source port number 896 are from the IP address 816 and port number 818 of the second client application communication protocol network node 812. This third session "S3" includes the fifth data packet 848 which was received as the fifth incoming data packet, and the seventh data packet 852, which was received as the seventh incoming data packet.

A fourth exemplary combination (tuple) is indicated by numeral 900. The Session ID is indicated by numeral 902 as "S4." The destination IP address 904 and the destination port number 906 are from the IP address 828 and port 830 of the server application communication protocol network node 826. The source IP address 908 and source port number 910 are from the IP address 816 and port number 822 of the third client application communication protocol network node 814. This fourth session "S4" includes the fourth data packet 846, which was received as the sixth incoming data packet.

Figure 12:
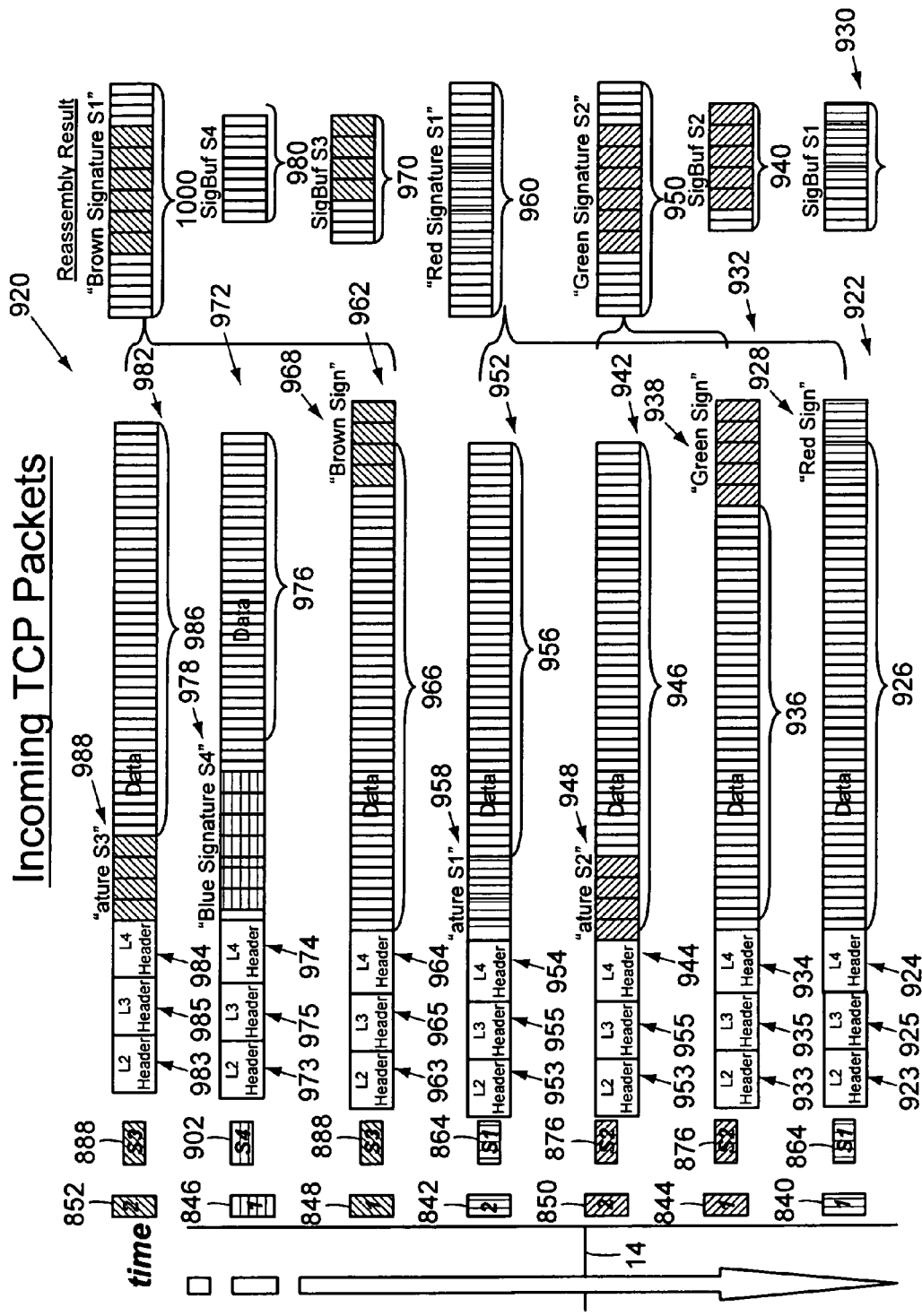
FIG. 12 illustrates an exemplary schematic diagram of a data packet flow, as shown in FIG. 11, entering a multiple packet signature scanning system in accordance with the present invention with associated reassembly of the data packets.

Referring now to FIG. 12, the packet reassembly process is generally indicated by numeral 920, where the incoming data packets are received in order with the first data packet 840 being received first and identified as part of Session "S1" 864, the third data packet 844 was received second and identified as part of Session "S2" 876, the sixth data packet 850 was received third and identified as part of Session "S2" 876, the second data packet 842 was received fourth and identified as part of Session "S1" 864, the fifth data packet 848 was received fifth and identified as part of Session "S3" 888, the fourth data packet 846 was received sixth and identified as part of Session "S4" 902 and the seventh data packet 852 was received seventh and identified as part of Session "S3" 888 in the server application communication protocol network node 826 as previously described with regard to FIG. 11.

The first entering Ethernet frame 922 is the first data packet 840 as part of Session "S1" 864 and contains a string "Red Sign" 928 in the payload data 926 and an "L2" header 923, which is associated with the Ethernet frame, an "L3" header 925, which is associated with the Internet Protocol (IP) header and an "L4" header 924, which is associated with the TCP header. Furthermore, the first Ethernet frame 922 will be parsed and the result of this parsing is that the payload data 926 is extracted from the headers 923, 925 and 924. The payload data 926 will then be stored in a first buffer 930, e.g., SigBuf S1.

The second entering Ethernet frame 932 is the third data packet 844 as part of Session "S2" 876 and contains a string "Green Sign" 938 in the payload data 936 and an "L2" header 933, which is associated with the Ethernet frame, an "L3" header 935, which is associated with the Internet Protocol (IP) header and an "L4" header 934, which is associated with the TCP header. Furthermore, the second Ethernet frame 932 will be parsed and the result of this parsing is that the payload data 936 is extracted from the headers 933, 935 and 934. A determination will be made if this second Ethernet frame 932 is of the same protocol connection (Session "S1" 864 versus Session "S2" 876). Since it is not the same protocol connection, the payload data 936 will then be stored in a second buffer 940, e.g., SigBuf S2.

The third entering Ethernet frame 942 is the sixth data packet 850 as part of Session "S2" 876 and contains a string "ature S2" 948 in the payload data 946 and an "L2" header 943, which is associated with the Ethernet frame, an "L3" header 945, which is associated with the Internet Protocol (IP) header and an "L4" header 944, which is associated with the TCP header. Furthermore, the third Ethernet frame 942 will be parsed and the result of this parsing is that the payload data 946 is extracted from the headers 943, 945 and 944. A determination will be made if this Ethernet frame 942 is of the same protocol connection of a prior entering Ethernet frame such as the second Ethernet Frame 932 (Session "S2" 876 versus Session "S2" 876). Since it is the same protocol connection, the payload data 946 will be concatenated with the payload data 936 stored in the second buffer 940, e.g., SigBuf S2, and this combination 950 is fed into the content search engine 44, as previously shown in FIG. 5. The rule table 40, also shown in FIG. 5, is operatively connected to the content engine 44, which contains patterns of characters to be searched such as "Brown Signature S1," "Red Signature S1," "Green Signature S2," "Blue Signature S4," and so forth. The pattern "Green Signature S2" will be detected as being present in the combination of these two data packets 932 and 942.

The fourth entering Ethernet frame 952 is a second data packet 842 as part of Session "S1" 864 and contains a string "ature S1" 958 in the payload data 956 and an "L2" header 953, which is associated with the Ethernet frame, an "L3" header 955, which is associated with the Internet Protocol (IP) header and an "L4" header 954, which is associated with the TCP header. Furthermore, the fourth Ethernet frame 952 will be parsed and the result of this parsing is that the payload data 956 is extracted from the headers 953, 955 and 954. A determination will be made if this fourth Ethernet frame 952 is of the same protocol connection of a prior entering Ethernet frame such as the first Ethernet Frame 922 (Session "S1" 864 versus Session "S1" 864). Since it is the same protocol connection, the payload data 956 will be concatenated with the payload data 926 stored in the first buffer 930, e.g., SigBuf S1, and this combination 960 is fed into the content search engine 44, as previously shown in FIG. 5. The rule table 40, also shown in FIG. 5, is operatively connected to the content engine 44, which contains patterns of characters to be searched such as "Brown Signature S1," "Red Signature S1," "Green Signature S2," "Blue Signature S4," and so forth. The pattern "Red Signature S1" will be detected as being present in the combination of these two data packets 922 and 952.

The fifth entering Ethernet frame 962 is the fifth data packet 848 as part of Session "S3" 888 and contains a string "Brown Sign" 968 in the payload data 966 and an "L2" header 963, which is associated with the Ethernet frame, an "L3" header 965, which is associated with the Internet Protocol (IP) header and an "L4" header 964, which is associated with the TCP header. Furthermore, the fifth Ethernet frame 962 will be parsed and the result of this parsing is that the payload data 966 is extracted from the headers 963, 965 and 964. A determination will be made if this fifth Ethernet frame 962 is of the same protocol connection of a prior entering Ethernet frame. The results will be negative and then the payload data 966 will then be stored in a third buffer 970, e.g., SigBuf S3.

The sixth entering Ethernet frame 972 is the fourth data packet 846 as part of Session "S4" 902 and contains a string "Blue Signature S4" 978 in the payload data 976 and an "L2" header 973, which is associated with the Ethernet frame, an "L3" header 975, which is associated with the Internet Protocol (IP) header and an "L4" header 974, which is associated with the TCP header. Furthermore, the sixth Ethernet frame 972 will be parsed and the result of this parsing is that the payload data 976 is extracted from the headers 973, 975 and 974. A determination will be made if this sixth Ethernet frame 972 is of the same protocol connection of a prior entering Ethernet frame. The results will be negative. Since the entire pattern is self-contained within the same payload data 976 for a single data packet, then data from the signature will not be stored in a fourth buffer 980, e.g., SigBuf S4. The payload data 972 is fed into the content search engine 44, as previously shown in FIG. 5. The rule table 40, also shown in FIG. 5, is operatively connected to the content engine 44, which contains patterns of characters to be searched such as "Brown Signature S1," "Red Signature S1," "Green Signature S2," "Blue Signature S4," and so forth. The pattern "Blue Signature S4" will be detected as being present in data packet 972.

The seventh entering Ethernet frame 982 is the seventh data packet 852 as part of Session "S3" 888 and contains a string "ature S3" 988 in the payload data 986 and an "L2" header 983, which is associated with the Ethernet frame, an "L3" header 985, which is associated with the Internet Protocol (IP) header and an "L4" header 984, which is associated with the TCP header. Furthermore, the seventh Ethernet frame 982 will be parsed and the result of this parsing is that the payload data 986 is extracted from the headers 983, 985 and 984. A determination will be made if this seventh Ethernet frame 982 is of the same protocol connection of the prior entering Ethernet frame such as the fifth Ethernet Frame 962 (Session "S3" 888 versus Session "S3" 888). Since it is the same protocol connection, the payload data 986 will be concatenated with the payload data 966 stored in the fourth buffer 970, e.g., SigBuf S3, and this combination 1000 is fed into the content search engine 44, as previously shown in FIG. 5. The rule table 40, also shown in FIG. 5, is operatively connected to the content engine 44, which contains patterns of characters to be searched such as "Brown Signature S1," "Red Signature S1," "Green Signature S2," "Blue Signature S4," and so forth. The pattern "Brown Signature S1" will be detected as being present in the combination of these two data packets 962 and 982.

Figure 13:
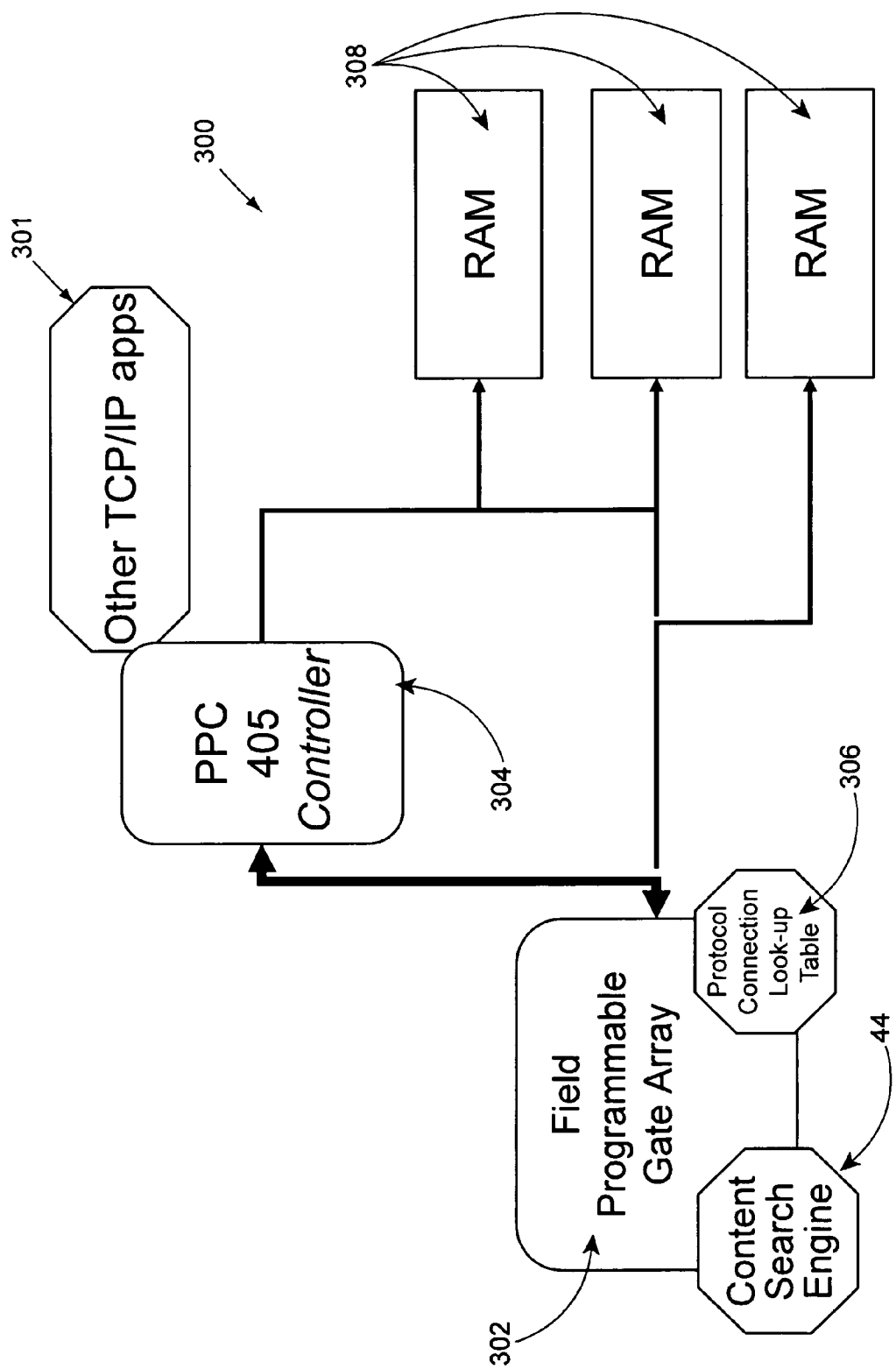
FIG. 13 illustrates an exemplary schematic diagram of an illustrative, but nonlimiting example, of representative computer hardware and associated connections for the multiple packet signature scanning system in accordance with the present invention.

Referring now to FIG. 13, an illustrative but nonlimiting, example of electronic hardware that may be utilized for the multiple packet signature scanner 30 is disclosed and generally indicated by numeral 300. However, a myriad of multiple electronic devices may suffice. This can include a field programmable gate array (FPGA) 302. A field programmable gate array (FPGA) 302 is a logic network that can be programmed into the device after being manufactured and typically includes an array of logic elements such as gates or lookup tables, flip-flops and/or other programmable interconnect wiring. An illustrative, but nonlimiting, example of a field programmable gate array, (FPGA) 302 can include a VIRTEX II PRO™, which is manufactured by Xilinx Inc., having a place of business at 2100 Logic Drive, San Jose, Calif. 95124-3400. The field programmable gate array (FPGA) 302 is electrically connected to a controller 304 that preferably includes a processor. An illustrative, but nonlimiting, example of a controller 304 can include a PowerPC Processor 405™, which is manufactured by the IBM Corporation having a place of business at 1133 Westchester Avenue, White Plains, N.Y. 10604. The field programmable gate array, (FPGA) 302 provides glue logic and exclusion logic for the implementation of the content search engine 44 as well as a look-up table 306 for protocol connection, e.g., session number, that is stored in the FIFO queue buffer 52, as shown in FIG. 2, for the multiple packet signature scanner 30 to quickly ascertain the protocol connection for an incoming data stream. "Glue logic" refers to software that provides some conversion, translation or other process that makes one system work with another.

The controller 304 also implements other communication protocol control applications 301, e.g., TCP/IP applications, as well as monitors and manages the multiple packet signature scanner 30 as well as monitoring communication between the multiple packet signature scanner 30 and the host where the multiple packet signature scanner 30 resides. There is a plurality of memories 308, e.g., Random Access Memories (RAM) that are electrically connected to both the field programmable gate array (FPGA) 302 and the controller 304.

As an alternative embodiment, the look-up table 306 for protocol connection, e.g., session number, can be electrically connected to the controller 304 rather than the field programmable gate array (FPGA) 302.

In FIGS. 14-17, the computer program steps associated with some of the primary functions are shown in flowcharts. In the description of flowcharts, the functional explanation marked with numerals in angle brackets, <nnn>, will refer to the flowchart blocks bearing that number.

Figure 14:
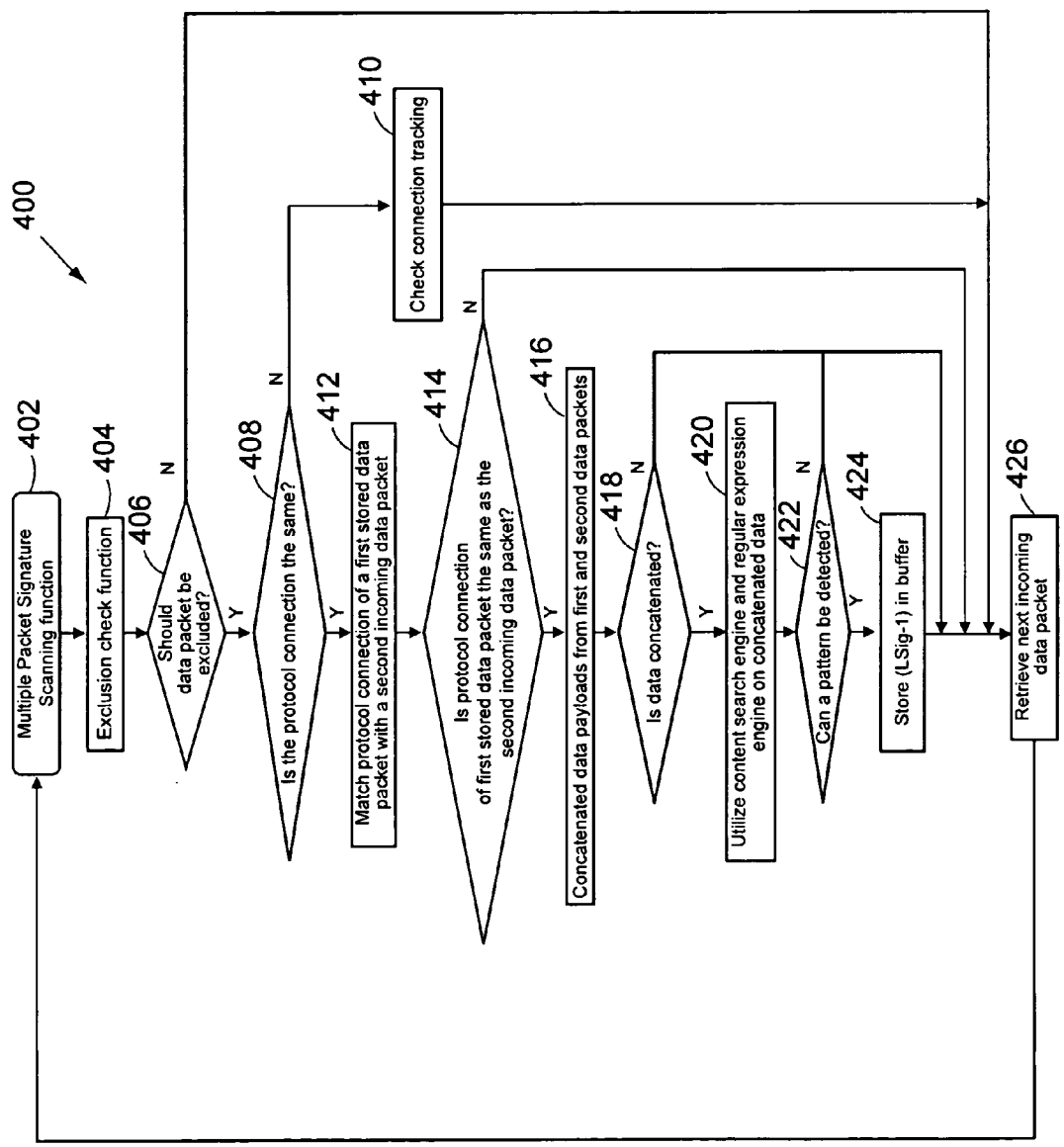
FIG. 14 illustrates an exemplary flowchart of the multiple packet signature scanning system in accordance with the present invention.

Referring now to FIG. 14, a general flowchart of the multiple packet signature scanning process is generally indicated by numeral 400. The basic multiple packet signature scanning function is indicated by numeral <402>. As shown in FIG. 2, there is first a check function utilizing the exclusion filter 48, to determine if the incoming data stream 32 should be returned to the output buffer 38 to become part of the outgoing data stream 36 or sent to the multiple packet signature scanner 30. Therefore, if the determination <406> regarding exclusion is negative, then the next incoming data packet is retrieved <426> and the data packet is returned to the output buffer 38 to become part of the outgoing data stream 36.

However, if the determination <406> regarding exclusion is positive, then there is a query as to whether the protocol transmission connection, e.g., TCP, that is uniquely identified by the combination (tuple) of destination address 124, destination port number 126, source address 128, source port number 130 and type of protocol 132, e.g., TCP, as shown in FIG. 6, is the same. If this query is negative in process step <408>, then a check of connection tracking information <410>, which is also shown in FIG. 8 by numeral 218, which is the state information about a connection in memory tables, such as source and destination addresses, port numbers, protocol types, connection states, and timeouts is performed prior to retrieving the next incoming data packet <426>. If the response to the query is positive in step <408>, then the communication protocol connection of a first stored data packet is compared to a second incoming data packet <412>.

A query is then performed to determine if the communication protocol connection of a first stored data packet is the same as the second incoming data packet <414>. If the response to this query is negative, then the next incoming data packet is retrieved <426> and the data packet is returned to the output buffer 38 to become part of the outgoing data stream 36. If the response to this query is positive, then the data payloads for the first stored data packet and the second incoming data packet are concatenated <416>.

A query is then made as to whether the payload data from the first and second data packets are concatenated <418>. If the response to this query is negative, then the next incoming data packet is retrieved <426> and the data packet is returned to the output buffer 38 to become part of the outgoing data stream 36. If the response to this query is positive, then the concatenated data is analyzed <420> by the content search engine 44 and/or the regular expression engine 42, as shown in FIG. 2.

A query is then made if a pattern can be detected in the concatenated data <422>. If the response to this query is negative, then the next incoming data packet is retrieved <426> and the data packet is returned to the output buffer 38 to become part of the outgoing data stream 36. If the response to this query is positive, then the concentrated data is potentially truncated and stored in a buffer <424> such as buffer 220, shown in FIG. 8, and is the maximum number of characters used in a pattern in characterizing a signature from the rule table 40, e.g., $L_{Sig}$, minus one (1) character, as shown in FIG. 2.

Figure 15:
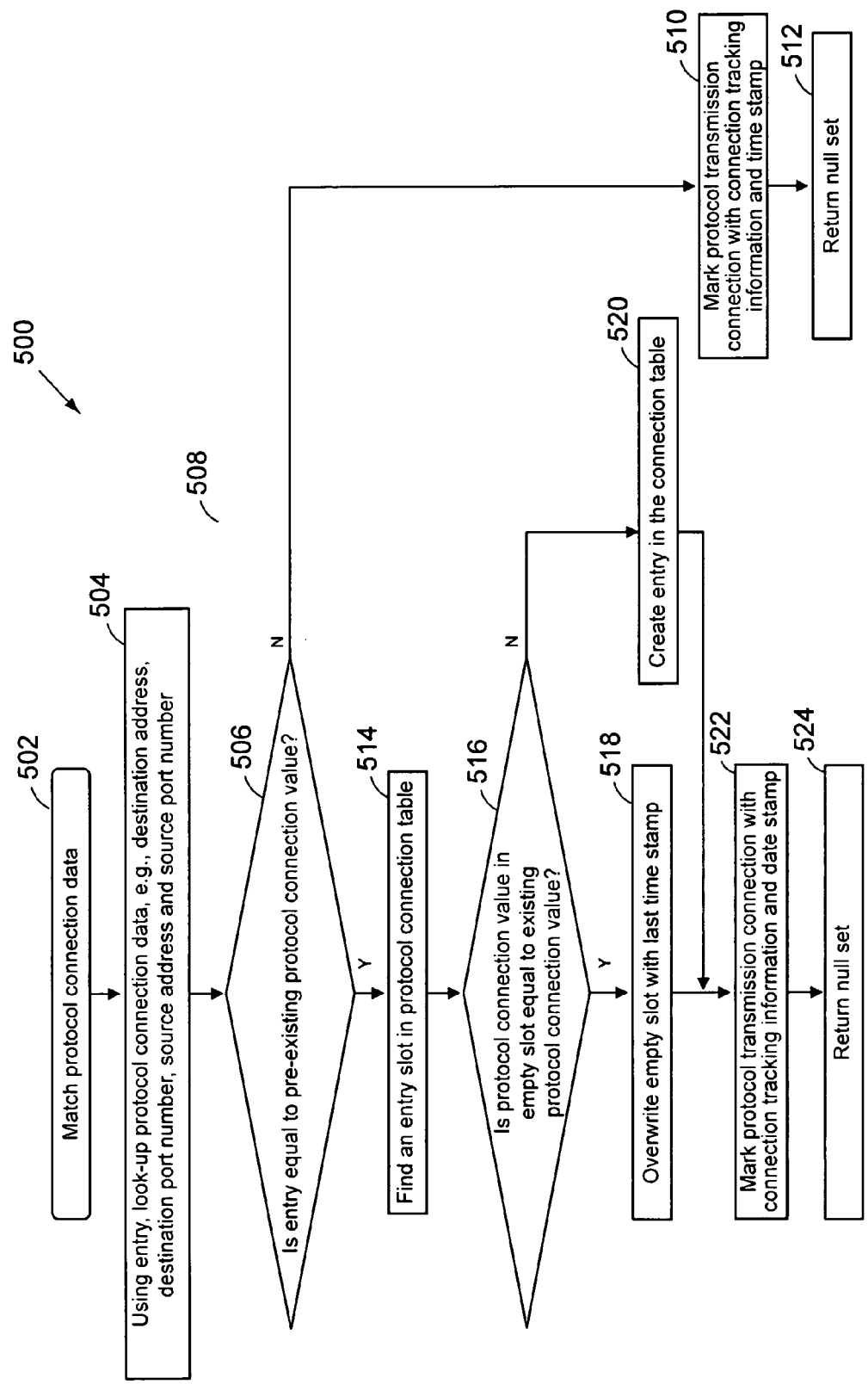
FIG. 15 illustrates an exemplary flowchart of a matching algorithm for communication protocols in a connection table in accordance with the present invention.

The second flowchart is illustrated on FIG. 15, which is a matching algorithm to determine if there is a communication protocol connection match <502>, utilizing a look-up table 306, as shown in FIG. 11. The first step is to receive an input of a communication protocol transmission connection <504>. An example of protocol transmission connection can be uniquely identified by the combination (tuple) of destination address 124, destination port number 126, source address 128, source port number 130 and type of protocol 132, e.g., TCP, as shown on FIG. 6.

A query <506> is then made if a protocol transmission connection value is equal to an existing communication protocol transmission connection value. If the response to this query is negative, then the current protocol transmission connection is marked with communication protocol connection tracking information 218, shown in FIG. 8, which is the state information about a connection in memory tables, such as source and destination addresses, port numbers, protocol types, connection states, and timeouts prior to retrieving the next incoming data packet as well as a time stamp 214 that provides a time entry to indicate when a particular protocol connection, e.g., session, has been registered or created. This function is indicated by numeral <510>. A value of null is then returned <512>.

If the response to this query in step <506> is positive and the inputted protocol transmission connection value is equal to an existing protocol transmission connection value, then there is a function <514> to find an empty slot in the look-up table 306. There is a query to determine if the protocol connection value in an empty slot in a connection table is equal to an existing communication protocol connection value <516>. If the response to this query is negative, then an entry is created in the communication protocol transmission connection table <520>, e.g., look-up table 306. Then the current protocol transmission connection is marked with connection tracking information 218, shown in FIG. 8, which is the state information about a connection in memory tables, such as source and destination Internet Protocol (IP) addresses, port numbers, protocol types, connection states, and timeouts prior to retrieving the next incoming data packet as well as a time stamp that provides a time entry to indicate when a particular protocol connection, e.g., session, has been registered or created. This function is indicated by step <522>. A value of null is then returned <524>.

If the response to the query in step <516> to determine if the protocol connection value in an empty slot is equal to an existing protocol connection value is positive, then the current slot in the connection table is overwritten with the last time stamp <518>. Then the current protocol transmission connection is marked with connection tracking information 218, shown in FIG. 8, which is the state information about a connection in memory tables, such as source and destination addresses, port numbers, protocol types, connection states, and timeouts prior to retrieving the next incoming data packet as well as a time stamp that provides a time entry to indicate when a particular communication protocol connection has been registered or created. This function is again indicated by numeral <522>. A value of null is then returned <524>.

Figure 16:
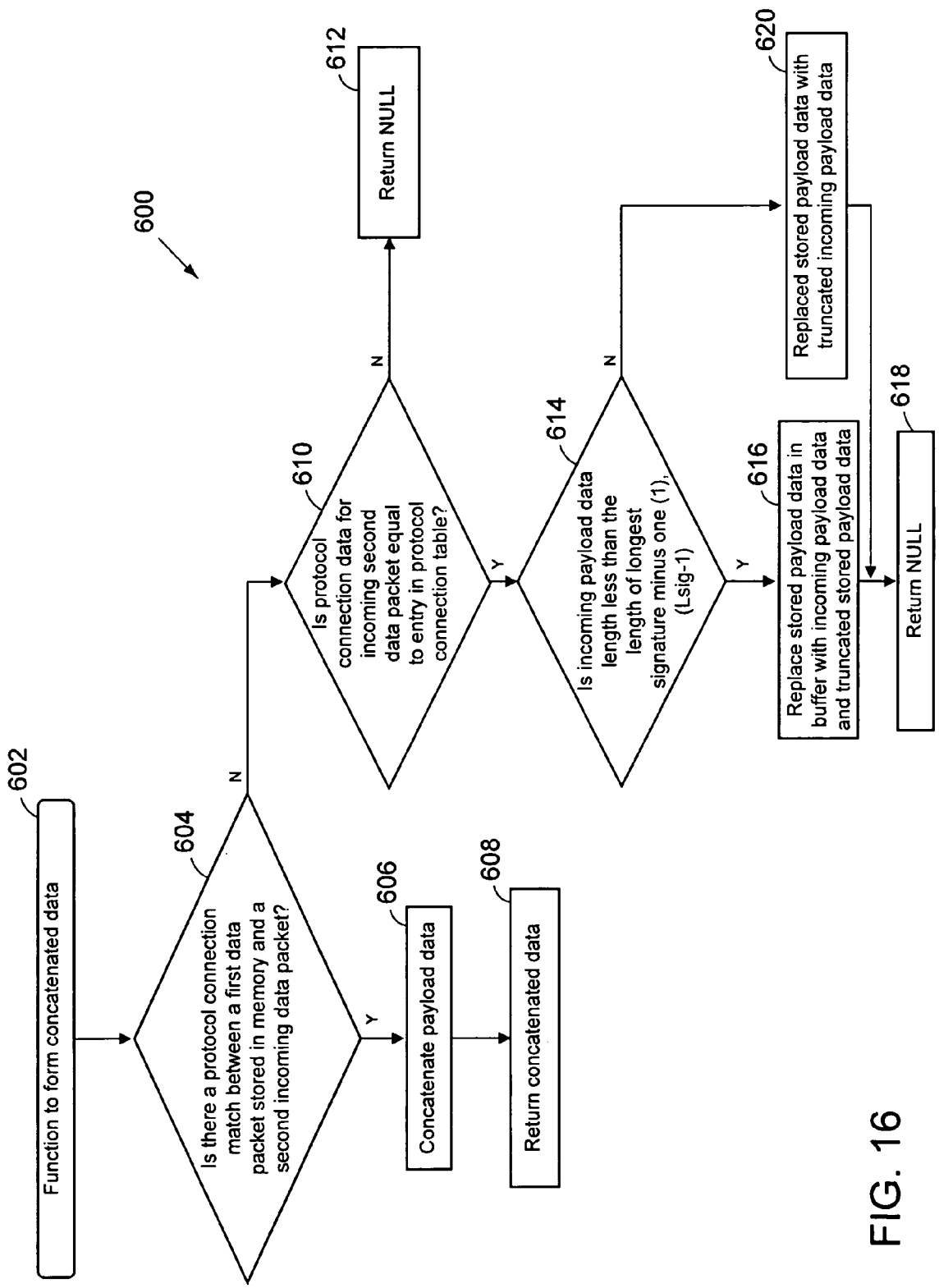
FIG. 16 illustrates an exemplary flowchart of an algorithm to append data to a buffer in preparation for content searching in accordance with the present invention.

The third flowchart is illustrated on FIG. 16, which is an algorithm to append payload data from adjacent packets as generally indicated by numeral 600. This general function is indicated as a function to concatenate payload data from adjacent data packets <602>. The first query is whether there is a communication protocol connection match between a first data packet stored in memory and an incoming second data packet <604>. If the response to this query is positive, then the payload data of the first data packet stored in memory and the incoming second data packet are concatenated <606> and then this concatenated payload data is then returned <608> as data to be searched for patterns.

If the response to this query is negative, then the protocol connection data for the incoming second data packet is compared against an associated entry in a protocol connection table <610>. If the response to this query is negative, then a value of null is then returned <612>. If the response to this query is positive, then there is a query <614> as to whether the length of the incoming payload data, e.g., Len (Data), is less than the length of the longest signature minus one (1) character, e.g., $L_{Sig}$. If the response to query <614> is positive, then the stored payload data in a buffer is replaced with the incoming payload data and a truncated stored payload data <616>. This is followed by a return of a value of null <618>. If the response to query <614> is negative, then the stored payload data in a buffer is replaced with a truncated incoming payload data <620>. This is also followed by a return of a value of null <618>. This process is to append data for use by the content search engine 44.

Figure 17:
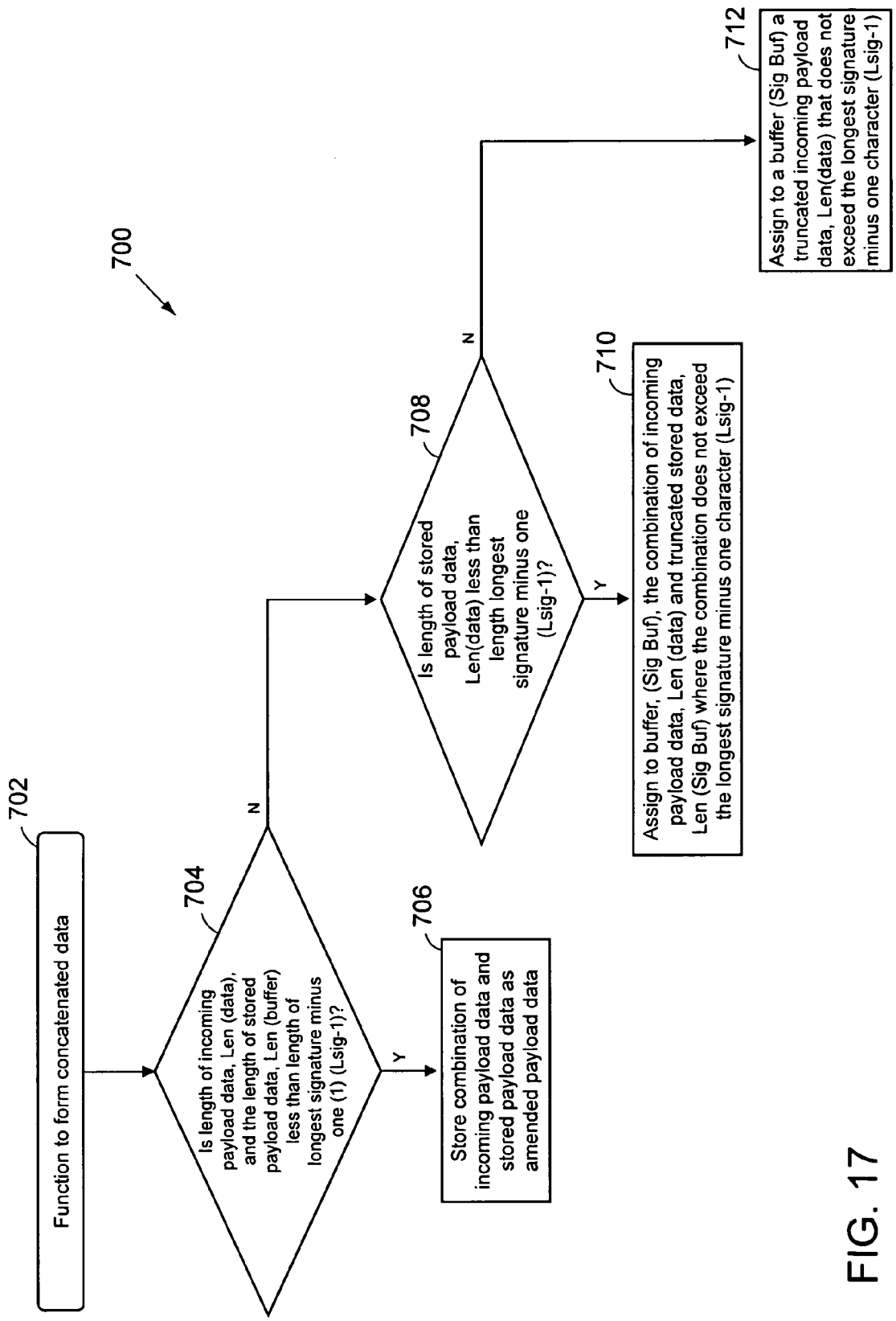
FIG. 17 illustrates an exemplary flowchart of an algorithm to store data in a memory buffer in preparation for content searching in accordance with the present invention.

The fourth flowchart is illustrated on FIG. 17, which is an algorithm to store data in a buffer and is generally indicated by numeral 700. This includes a first function which is to store payload data in a buffer indicated by numeral <702>. There is a query <704> to determine if the length of the incoming payload data, e.g., Len (data), and the length of the stored payload data, e.g., Len (BufSig), is less than the length of the longest signature minus one (1) character, e.g., $L_{Sig}$. If the response to the query <704> is positive, then the combination of incoming payload data and stored payload data is amended and stored as amended payload data <706>. If the response to the query <704> is negative, then there is a query <708> as to whether the length of the stored payload data is less than the length of the longest signature minus one (1) character, e.g., $L_{Sig}$.

If the response to query <708> is positive, then the data assigned to the buffer is a combination of the incoming payload data and the stored payload data where the stored payload data is truncated so that the combination of the incoming payload data and the truncated stored payload data does not exceed the length of the longest signature minus one (1) character, e.g., $L_{Sig}$, as indicated by numeral <710>. If the response to query <708> is negative, then the data assigned to the buffer is a truncated incoming payload data that does not exceed the length of the longest signature minus one (1) character, e.g., $L_{Sig}$, as indicated by process step <712>.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A method for inspecting a data packet stream in a computer network for patterns that fall across data packet boundaries comprising:
   determining if two or more data packets are consecutive in the data packet stream;
   combining data payloads from the consecutive data packets; and
   analyzing the combined data payloads from the consecutive data packets for a plurality of patterns of character combinations, wherein the longest length of the combined data payloads is one less than the largest number of characters for a pattern having a longest length of the plurality of patterns of character combinations.

2. The method for inspecting a data packet stream in a computer network for patterns that fall across data packet boundaries according to claim 1, wherein the determining if two or more data packets are consecutive in the data packet stream includes reviewing communication protocol connections for the two or more data packets.

3. The method for inspecting a data packet stream in a computer network for patterns that fall across data packet boundaries according to claim 2, wherein the communication protocol connections include a destination address, a destination port number, a source address, a source port number and a type of communication protocol.

4. The method for inspecting a data packet stream in a computer network for patterns that fall across data packet boundaries according to claim 3, wherein the type of communication protocol is selected from the group consisting of Transmission Control Protocol (TCP), User Datagram Protocol (UDP), AppleTalk Echo Protocol (AEP), Authenticated Mail Transfer Protocol (AMTP), AppleTalk Transaction Protocol (ATP), Cyclic User Datagram Protocol (CUDP), Internet Link Protocol (IL), Name Binding Protocol (NBP), NetBIOS Extended User Interface (NetBEUI), Routing Table Maintenance Protocol (RTMP), Server Message Block (SMB), Sequential Packet Exchange (SPX), Stream Control Transmission Protocol (SCTP), or Routing Update Protocol (RTP).

5. The method for inspecting a data packet stream in a computer network for patterns that fall across data packet boundaries according to claim 1, wherein the plurality of patterns of character combinations are stored in a rule table.

6. The method for inspecting a data packet stream in a computer network for patterns that fall across data packet boundaries according to claim 1, wherein the analyzing the combined data payloads from the consecutive data packets for a plurality of patterns of character combinations includes utilizing a content search engine.

7. The method for inspecting a data packet stream in a computer network for patterns that fall across data packet boundaries according to claim 1, wherein the analyzing the combined data payloads from the consecutive data packets for a plurality of patterns of character combinations includes utilizing a regular expression engine.

8. The method for inspecting a data packet stream in a computer network for patterns that fall across data packet boundaries according to claim 1, wherein the analyzing the combined data payloads from the consecutive data packets for a plurality of patterns of character combinations includes utilizing a content search engine and a regular expression engine.

9. The method for inspecting a data packet stream in a computer network for patterns that fall across data packet boundaries according to claim 1, further comprising parsing a header from each data packet from the data packet stream to form a parsed data packet stream.

10. The method for inspecting a data packet stream in a computer network for patterns that fall across data packet boundaries according to claim 9, further comprising determining if parsed header information from data packets in the data packet stream indicate whether each data packet should be combined with at least one other data packet and analyzed for patterns or returned to an outgoing data packet stream based on predetermined criteria utilized with an exclusion filter.

11. The method for inspecting a data packet stream in a computer network for patterns that fall across data packet boundaries according to claim 10, wherein the predetermined criteria is selected from the group consisting of a destination communication protocol address, a flag, or a destination communication protocol port number.

12. The method for inspecting a data packet stream in a computer network for patterns that fall across data packet boundaries according to claim 1, wherein the combining data payloads from the plurality of consecutive data packets includes utilizing a multiple packet signature scanner.

13. The method for inspecting a data packet stream in a computer network for patterns that fall across data packet boundaries according to claim 12, wherein the multiple packet signature scanner utilizes a first-in and first-out memory buffer.

14. The method for inspecting a data packet stream in a computer network for patterns that fall across data packet boundaries according to claim 1, wherein the combining data payloads from the consecutive data packets includes utilizing a multiple packet signature scanner and the analyzing the combined data payloads for a plurality of patterns with a content search engine and a regular expression engine.

15. The method for inspecting a data packet stream in a computer network for patterns that fall across data packet boundaries according to claim 14, wherein the multiple packet signature scanner, the content search engine, and the regular expression engine are electrically connected to an interface.

16. The method for inspecting a data packet stream in a computer network for patterns that fall across data packet boundaries according to claim 12, further comprising determining if data packets reside in the multiple packet signature scanner for over a predetermined time period and removing these data packets from the multiple packet signature scanner.

17. The method for inspecting a data packet stream in a computer network for patterns that fall across data packet boundaries according to claim 2, wherein the determining if two or more data packets are consecutive includes reviewing an indication of a next communication protocol connection.

18. The method for inspecting a data packet stream in a computer network for patterns that fall across data packet boundaries according to claim 2, wherein the determining if two or more data packets are consecutive further includes reviewing communication protocol connection information which is selected from the group consisting of a source address, a source port number, a designation address, a destination port number, a type of communication protocol, a connection state or a timeout.

19. The method for inspecting a data packet stream in a computer network for patterns that fall across data packet boundaries according to claim 2, wherein the determining if two or more data packets are consecutive further includes reviewing communication protocol connection information includes utilizing at least one protocol connection look-up table.

20. The method for inspecting a data packet stream in a computer network for patterns that fall across data packet boundaries according to claim 19, wherein the at least one protocol connection look-up table includes a plurality of protocol connection look-up tables having an interrelated hierarchy.

21. The method for inspecting a data packet stream in a computer network for patterns that fall across data packet boundaries according to claim 1, wherein the analyzing the combined data payloads from the consecutive data packets for a plurality of patterns of character combinations includes determining that the combination of the consecutive data packets, which includes at least one first data packet stored in memory and an incoming second data packet, exceeds the longest length of the combined data payloads and the length of the at least one first data packet stored in memory is less than the longest length of the combined data payloads, then truncating the length of the at least one first data packet stored in memory so that the combination of the incoming second data packet and the at least one first data packet stored in memory is equal to the longest length of the combined data payloads, which is one less than the largest number of characters for a pattern having the longest length of the plurality of patterns of character combinations.

22. The method for inspecting a data packet stream in a computer network for patterns that fall across data packet boundaries according to claim 1, wherein the analyzing the combined data payloads from the consecutive data packets for a plurality of patterns of character combinations, includes determining that the combination of the consecutive data packets, which includes at least one first data packet stored in memory and an incoming second data packet, exceeds the longest length of the combined data payloads and the length of the at least one first data packet stored in memory is greater than the longest length of the combined data payloads, then truncating the length of the incoming second data packet so that the incoming second data packet is equal to the longest length of the combined data payloads, which is one less than the largest number of characters for a pattern having the longest length of the plurality of patterns of character combinations.

23. A method for inspecting a data packet stream in a computer network for patterns that fall across data packet boundaries comprising:
 determining if two or more data packets are consecutive in the data packet stream by reviewing communication protocol connections for the plurality of data packets, wherein the communication protocol connections include a destination address, a destination port number, a source address, a source port number and a type of communication protocol;
 combining data payloads from the consecutive data packets; and
 analyzing the combined data payloads from the consecutive data packets for a plurality of patterns of character combinations with at least one of a content search engine and a regular expression engine, wherein the longest length of the combined data payloads is one less than the largest number of characters for a pattern having a longest length of the plurality of patterns of character combinations.

24. A system for inspecting a data packet stream for patterns that fall across data packet boundaries comprising:
 a data packet analyzer that receives an incoming stream of data packets and determines if two or more data packets are consecutive;
 a multiple packet signature scanner that combines data payloads from the consecutive data packets; and
 a data pattern analyzer for reviewing combined data payloads from the consecutive data packets for a plurality of patterns of character combinations, wherein the longest length of the combined data payloads is one less than the largest number of characters for a pattern having a longest length of the plurality of patterns of character combinations.

25. The system for inspecting a data packet stream for patterns that fall across data packet boundaries according to claim 24, wherein the data packet analyzer includes a controller.

26. The system for inspecting a data packet stream for patterns that fall across data packet boundaries according to claim 24, wherein the data packet analyzer includes a header parser.

27. The system for inspecting a data packet stream for patterns that fall across data packet boundaries according to claim 24, wherein the data packet analyzer reviews communication protocol connections for the two or more data packets.

28. The system for inspecting a data packet stream for patterns that fall across data packet boundaries according to claim 24, wherein the data packet analyzer reviews communication protocol connections for the two or more data packets with at least one protocol connection look-up table.

29. The system for inspecting a data packet stream for patterns that fall across data packet boundaries according to claim 28, wherein the at least one protocol connection look-up table includes a plurality of protocol connection information look-up tables having an interrelated hierarchy.

30. The system for inspecting a data packet stream for patterns that fall across data packet boundaries according to claim 27, wherein the communication protocol connections includes a destination address, a destination port number, a source address, a source port number and a type of communication protocol.

31. The system for inspecting a data packet stream for patterns that fall across data packet boundaries according to claim 24, wherein the data packet analyzer includes an exclusion filter that can return data packets to an outgoing data stream based on predetermined criteria.

32. The system for inspecting a data packet stream for patterns that fall across data packet boundaries according to claim 31, wherein the predetermined criteria is selected from the group consisting of a destination communication protocol address, a flag, a destination communication protocol port number or a next communication protocol connection.

33. The system for inspecting a data packet stream for patterns that fall across data packet boundaries according to claim 24, wherein the incoming stream of data packets is received by a controller and then has heading information from each data packet parsed with a header parser and then is analyzed and routed based on predetermined criteria with an exclusion filter.

34. The system for inspecting a data packet stream for patterns that fall across data packet boundaries according to claim 24, wherein the multiple packet signature scanner is operatively connected to a first-in and first-out memory buffer.

35. The system for inspecting a data packet stream for patterns that fall across data packet boundaries according to claim 24, wherein the multiple packet signature scanner is operatively connected to an external memory.

36. The system for inspecting a data packet stream for patterns that fall across data packet boundaries according to claim 24, wherein the multiple packet signature scanner is operatively connected to a first-in and first-out memory buffer and the multiple packet signature scanner is operatively connected to an external memory.

37. The system for inspecting a data packet stream for patterns that fall across data packet boundaries according to claim 24, wherein the data pattern analyzer includes a content search engine.

38. The system for inspecting a data packet stream for patterns that fall across data packet boundaries according to claim 24, wherein the data pattern analyzer includes a regular expression search engine.

39. The system for inspecting a data packet stream for patterns that fall across data packet boundaries according to claim 24, wherein the data pattern analyzer includes a rule table that can store a plurality of patterns of character combinations.

40. The system for inspecting a data packet stream for patterns that fall across data packet boundaries according to claim 24, wherein the data pattern analyzer includes a content search engine, a regular expression search engine and a rule table that can store a plurality of patterns of character combinations.

41. The system for inspecting a data packet stream for patterns that fall across data packet boundaries according to claim 24, further comprising an interface that is operatively connected to the multiple packet signature scanner, a content search engine and a regular expression search engine.

42. The system for inspecting a data packet stream for patterns that fall across data packet boundaries according to claim 24, further comprising an output buffer that provides an outgoing data stream that is operatively connected to the data packet analyzer and the data pattern analyzer.

43. The system for inspecting a data packet stream for patterns that fall across data packet boundaries according to claim 24, further comprising a timer for determining if data packets reside in the multiple packet signature scanner for over a predetermined time period and removing these data packets from the multiple packet signature scanner.

44. A system for inspecting a data packet stream for patterns that fall across data packet boundaries comprising:
   a data packet analyzer that receives an incoming stream of data packets and determines if two or more data packets are consecutive by reviewing communication protocol connections;
   a multiple packet signature scanner that combines data payloads from the consecutive data packets in a buffer; and
   a data pattern analyzer for reviewing combined data payloads from the consecutive data packets for a plurality of patterns of character combinations, wherein the longest length of the combined data payloads is one less than the largest number of characters for a pattern having a longest length of the plurality of patterns of character combinations, wherein the data pattern analyzer includes a content searching engine and a regular expression engine.

45. The system for inspecting a data packet stream for patterns that fall across data packet boundaries according to claim 44, further comprising a controller electrically connected to a field programmable gate array, wherein the field programmable gate array is electrically connected to a protocol connection look-up table and a content searching engine.

46. The system for inspecting a data packet stream for patterns that fall across data packet boundaries according to claim 44, further comprising a controller electrically connected to a field programmable gate array, wherein the controller is electrically connected to a protocol connection look-up table and the field programmable gate array is electrically connected to a content searching engine.

* * * * *